United States Patent
Shichino

(10) Patent No.: US 12,034,316 B2
(45) Date of Patent: Jul. 9, 2024

(54) POWER TRANSMITTING APPARATUS, CONTROL METHOD FOR POWER TRANSMITTING APPARATUS, AND STORAGE MEDIUM

(71) Applicant: CANON KABUSHIKI KAISHA, Tokyo (JP)

(72) Inventor: Takahiro Shichino, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 32 days.

(21) Appl. No.: 18/061,647

(22) Filed: Dec. 5, 2022

(65) Prior Publication Data

US 2023/0099616 A1    Mar. 30, 2023

Related U.S. Application Data

(63) Continuation of application No. PCT/JP2021/015023, filed on Apr. 9, 2021.

(30) Foreign Application Priority Data

Jun. 10, 2020    (JP) .................. 2020-101076

(51) Int. Cl.
| | | |
|---|---|---|
| H02J 50/60 | (2016.01) | |
| H02J 50/10 | (2016.01) | |
| H02J 50/40 | (2016.01) | |
| H02J 50/80 | (2016.01) | |
| H04W 76/11 | (2018.01) | |

(52) U.S. Cl.
CPC .............. *H02J 50/60* (2016.02); *H02J 50/10* (2016.02); *H02J 50/402* (2020.01); *H02J 50/80* (2016.02); *H04W 76/11* (2018.02)

(58) Field of Classification Search
CPC .. H02J 50/60; H02J 50/80; H02J 50/10; H02J 50/402; H04W 76/11
USPC .......................................................... 307/104
See application file for complete search history.

(56) References Cited

U.S. PATENT DOCUMENTS

| | | | | |
|---|---|---|---|---|
| 2016/0190818 | A1* | 6/2016 | He ...................... | H02J 50/10 |
| | | | | 307/104 |
| 2016/0197513 | A1* | 7/2016 | Uchimoto ............. | H04B 5/79 |
| | | | | 320/108 |
| 2017/0104370 | A1* | 4/2017 | Watanabe ............. | H02J 50/80 |
| 2018/0219416 | A1* | 8/2018 | Van Wageningen ......... |
| | | | | H02J 7/00309 |

FOREIGN PATENT DOCUMENTS

| | | |
|---|---|---|
| JP | 2015-056959 A | 3/2015 |
| JP | 2017-070074 A | 4/2017 |
| JP | 2018-068008 A | 4/2018 |
| JP | 2018-520630 A | 7/2018 |
| JP | 2019-187070 A | 10/2019 |
| WO | 2017/012979 A | 1/2017 |

\* cited by examiner

*Primary Examiner* — Alfonso Perez Borroto
(74) *Attorney, Agent, or Firm* — Canon U.S.A., Inc. I.P. Division

(57) ABSTRACT

A power transmitting apparatus (100) performs foreign object detection processing based on data obtained by transmitting power to a plurality of power receiving apparatuses (204, 205) using a plurality of power transmission units.

17 Claims, 16 Drawing Sheets

FIG. 4

| CONDITION | RECEPTION POWER OF RX204 | RECEPTION POWER OF RX205 |
|---|---|---|
| CONDITION 1 | 1W (Light Load) | 10W (Connected Load) |
| CONDITION 2 | 5W (Connected Load) | 10W (Connected Load) |
| CONDITION 3 | 5W (Connected Load) | 1W (Light Load) |
| CONDITION 4 | 1W (Light Load) | 1W (Light Load) |

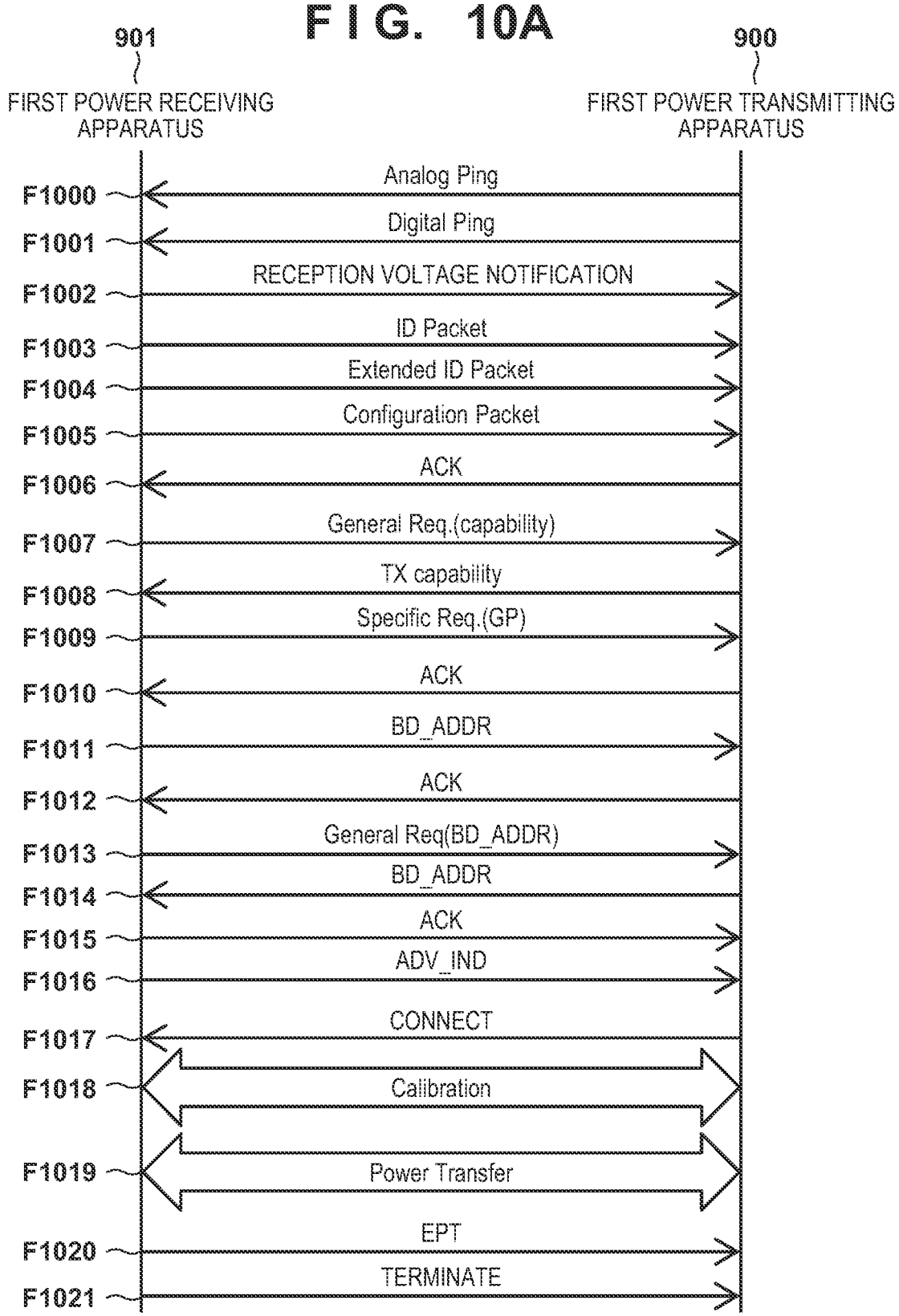

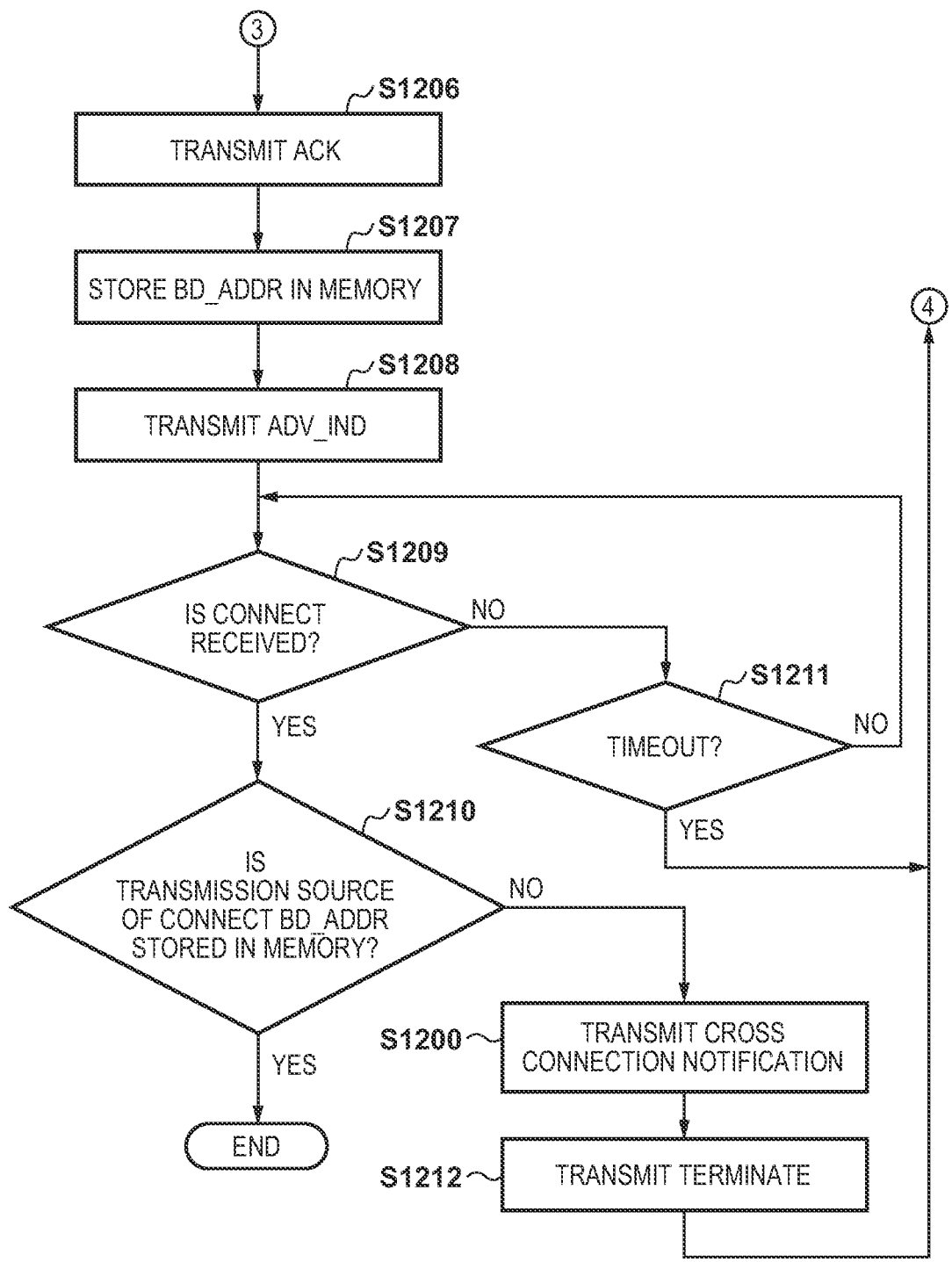
F I G. 12B

POWER TRANSMITTING APPARATUS, CONTROL METHOD FOR POWER TRANSMITTING APPARATUS, AND STORAGE MEDIUM

CROSS-REFERENCE TO RELATED APPLICATIONS

This application is a Continuation of International Patent Application No. PCT/JP2021/015023, filed Apr. 9, 2021, which claims the benefit of Japanese Patent Application No. 2020-101076 filed Month Jun. 10, 2020, both of which are hereby incorporated by reference herein in their entireties.

BACKGROUND

Field

The present disclosure relates to a wireless power transmission technique.

Background Art

Development of technology relating to wireless power transmission systems has been carried out extensively. A power transmitting apparatus and a power receiving apparatus compliant with a standard (the Wireless Power Consortium (WPC) standard) developed by the WPC, a group for promoting wireless charging standards, are described in PTL 1. Also, a method for foreign object detection relating to the Qi standard is described in PTL 2. Herein, a foreign object is an object with electrical conductivity such as a metal piece or the like. In the WPC standard, first, from the difference between the transmission power at a power transmitting apparatus and the reception power at a power receiving apparatus, the power loss amount in a state where there is no foreign object between the power transmitting apparatus and the power receiving apparatus is calculated in advance, and the calculated value is taken as the power loss amount in a normal state (state with no foreign object) during power transmission processing. Then, when the power loss amount between the power transmitting apparatus and the power receiving apparatus calculated during power transmission thereafter is separated from the power loss amount in a normal state, i.e., the reference, by a value equaling a threshold or greater, it is determined that "there is a foreign object".

CITATION LIST

Patent Literature

PTL 1: Japanese Patent Laid-Open No. 2015-56959
PTL 2: Japanese Patent Laid-Open No. 2017-70074

With a power transmitting apparatus capable of simultaneously transmitting power to a plurality of power receiving apparatuses, when a first power receiving apparatus and a second power receiving apparatus are placed on the power transmitting apparatus, there is a possibility that the power loss amount between the power transmitting apparatus and the first power receiving apparatus may be affected by the second power receiving apparatus. In a similar manner, there is a possibility that the power loss amount between the power transmitting apparatus and the second power receiving apparatus may be affected by the first power receiving apparatus. Accordingly, when there is a change in the state (number of power receiving apparatuses or the like) of the power receiving apparatuses placed on the power transmitting apparatus, a change also occurs in the power loss amount between the power transmitting apparatus and the power receiving apparatus in a normal state calculated in advance. This also may reduce the foreign object detection accuracy. Also, when the power transmitting apparatus and the plurality of power receiving apparatuses have a communication function using BLE (Bluetooth (registered trademark) Low Energy), a connection with a device that is not the power transmitting and receiving target of the power transmitting apparatus and the power receiving apparatuses may be established, or in other words, the problem of cross connection may occur.

SUMMARY

In light of the problems described above, the present disclosure provides a technique for appropriately transmitting power from a power transmitting apparatus to a plurality of power receiving apparatuses.

According to one aspect of the present disclosure, there is provided a power transmitting apparatus comprising: a first power transmitting unit configured to wirelessly transmit power to a first power receiving apparatus; a second power transmitting unit configured to wirelessly transmit power to a second power receiving apparatus; a first obtaining unit configured to obtain first data indicating a relationship between transmission power of the first power transmitting unit and reception power of the first power receiving apparatus when power is transmitted to the first power receiving apparatus using the first power transmitting unit; a second obtaining unit configured to obtain second data indicating a relationship between transmission power of the second power transmitting unit and reception power of the second power receiving apparatus when power is transmitted to the second power receiving apparatus using the second power transmitting unit; a third obtaining unit configured to obtain third data indicating a relationship between transmission power of the first power transmitting unit and the second power transmitting unit and reception power of the first power receiving apparatus and the second power receiving apparatus when power is transmitted to the first power receiving apparatus and the second power receiving apparatus simultaneously using the first power transmitting unit and the second power transmitting unit; and a detecting unit configured to detect an object that is not the first power receiving apparatus or the second power receiving apparatus using the first data, the second data, and the third data.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the present disclosure and, together with the description, serve to explain principles of the present disclosure.

FIG. 4 is a conceptual diagram illustrating the conditions for obtaining Calibration data.

FIG. 10A is an operation sequence diagram of the wireless power transmission system according to the second embodiment.

FIG. 12B is a diagram of the processing flow of the power receiving apparatus according to the second embodiment.

DESCRIPTION OF THE EMBODIMENTS

Figure 1:
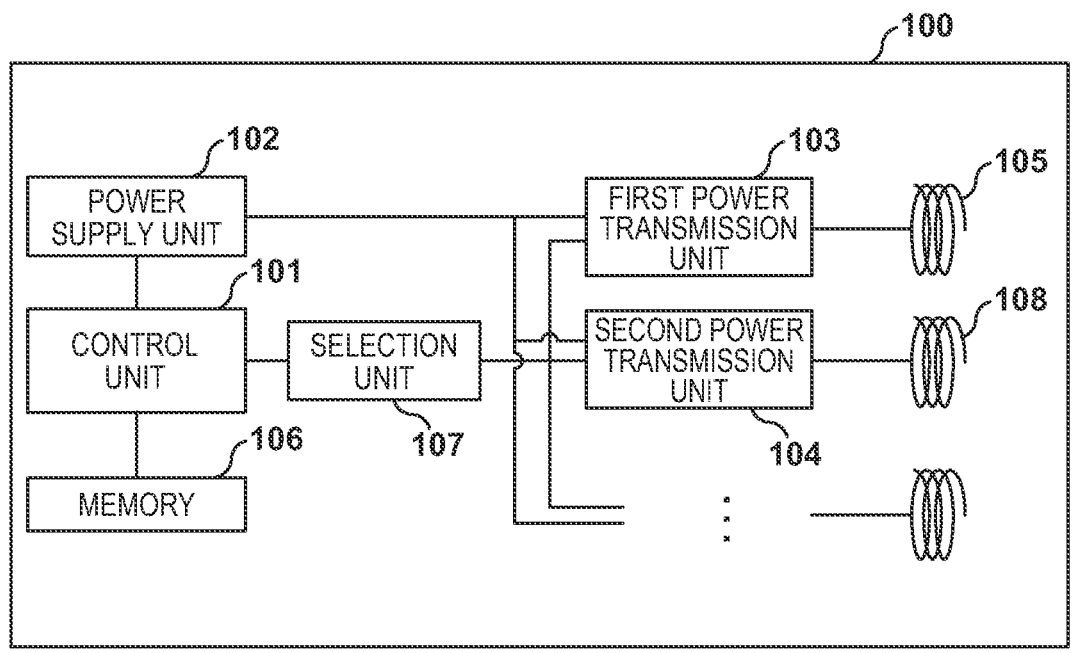
FIG. 1 is a block diagram illustrating an example configuration of a power transmitting apparatus according to a first embodiment.

Hereinafter, embodiments will be described in detail with reference to the attached drawings. Note, the following embodiments are not intended to limit the scope of the present disclosure. Multiple features are described in the embodiments, but limitation is not made to the present disclosure that requires all such features, and multiple such features may be combined as appropriate. Furthermore, in the attached drawings, the same reference numerals are given to the same or similar configurations, and redundant description thereof is omitted.

Foreign Object Detection Method based on Power Loss Method

Figure 6:
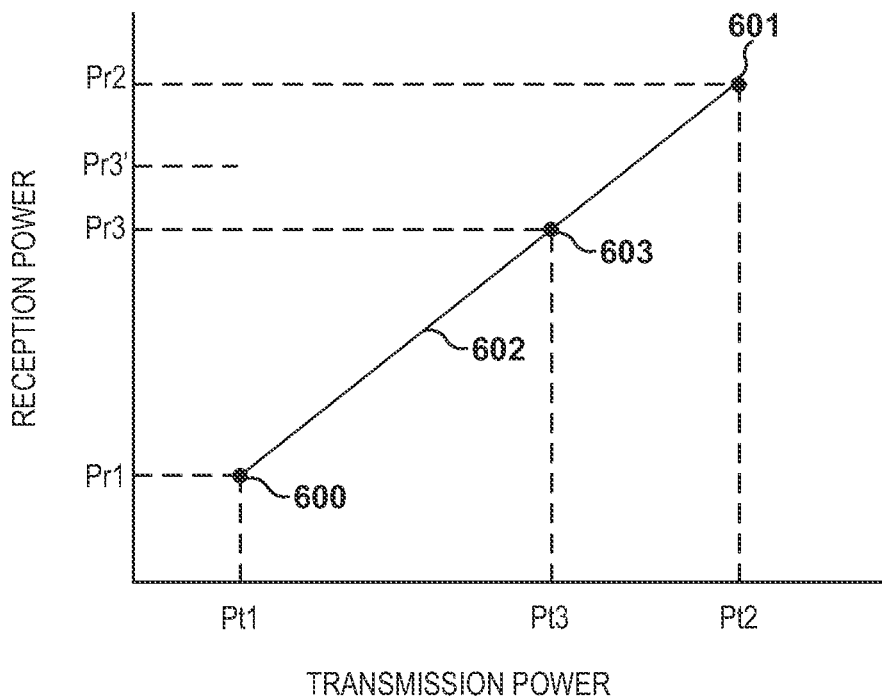
FIG. 6 is a diagram for describing a foreign object detection method based on the power loss method.

First, a foreign object detection method based on the power loss method specified in the WPC standard will be described using FIG. 6. FIG. 6 is a diagram for describing the foreign object detection method based on the power loss method. In FIG. 6, the transmission power of a power transmitting apparatus is represented on the horizontal axis, and the reception power of a power receiving apparatus is represented on the vertical axis. A foreign object is an object with electrical conductivity such as a metal piece or the like that is not the power receiving apparatus.

First, the power transmitting apparatus transmits power to the power receiving apparatus and receives a reception power value Pr1 (referred to as a Light Load) corresponding to the power received by the power receiving apparatus from the power receiving apparatus. At this time, the power receiving apparatus does not supply the power received to the load (charging circuit, battery, or the like). Then, the power transmitting apparatus stores a transmission power value Pt1 of that time (point 600). At this time, the power transmitting apparatus can recognize that the power loss amount between the power transmitting apparatus and the power receiving apparatus when Pt1 is transmitted as the transmission power corresponds to Pt1−Pr1 (Ploss1). Next, the power transmitting apparatus receives a value of a reception power value Pr2 (referred to as a Connected Load) corresponding to the power received by the power receiving apparatus. At this time, the power receiving apparatus supplies the power received to the load. Then, the power transmitting apparatus stores a transmission power value Pt2 of that time (point 601). At this time, the power transmitting apparatus can recognize that the power loss amount between the power transmitting apparatus and the power receiving apparatus when Pt2 is transmitted as the transmission power corresponds to Pt2−Pr2 (Ploss2). Then, the power transmitting apparatus performs linear interpolation using the point 600 and the point 601 and generates a straight line 602. The straight line 602 indicates the relationship between the transmission power and the reception power in a state where there is no foreign object near the power transmitting apparatus and the power receiving apparatus. Accordingly, the reception power in a state where there is no foreign object can be estimated by the power transmitting apparatus from the transmission power value and the straight line 602. For example, when the transmission power value is Pt3, from a point 603 on the straight line 602 indicating the transmission power value is Pt3, the reception power value can be estimated to be Pr3.

Herein, in a case where the power transmitting apparatus has transmitted power to the power receiving apparatus using a transmission power of Pt3, the power transmitting apparatus receives a value corresponding to a reception power value Pr3' from the power receiving apparatus. The power transmitting apparatus calculates a value Pr3−Pr3' (=Ploss_FO) obtained by subtracting the reception power value Pr3' corresponding to the actual power received from the power receiving apparatus from the reception power value Pr3 in a state where there is no foreign object. The Ploss_FO can be considered the power loss consumed by the foreign object when there is a foreign object between the power transmitting apparatus and the power receiving apparatus. Thus, when the power Ploss_FO considered to be consumed by the foreign object is greater than a predetermined threshold, it is determined that a foreign object exists.

Alternatively, the power transmitting apparatus obtains in advance a power loss amount Pt3−Pr3 (Ploss3) between the power transmitting apparatus and the power receiving apparatus from the reception power value Pr3 in a state where there is no foreign object. Next, a power loss amount Pt3−Pr3' (Ploss3') between the power transmitting apparatus and the power receiving apparatus in a state where there is a foreign object is obtained from the reception power value Pr3' corresponding to the power received from the power receiving apparatus in a state where there is a foreign object.

Also, the power Ploss_FO considered to be consumed by the foreign object may be obtained from Ploss3'−Ploss3 (=Ploss_FO).

As described above, the method of obtaining the power Ploss_FO considered to be consumed by the foreign object may include obtaining Pr3−Pr3' (=Ploss_FO) or may include obtaining Ploss3'−Ploss3 (=Ploss_FO). Hereinafter, in the present specification, basically, the method of obtaining Ploss3'−Ploss3 (=Ploss_FO) is used, but the method of obtaining Pr3−Pr3' (=Ploss_FO) may also be applied. This concludes the description of foreign object detection based on the power loss method.

First Embodiment

The foreign object detection method described above (PTL 1) is a foreign object detection method when there is a one-to-one relationship between a power transmitting apparatus and a power receiving apparatus. The foreign object detection method according to the first embodiment described below is based on the power loss when one power transmitting apparatus simultaneously charges a plurality of power receiving apparatuses.

System Configuration

Figure 2:
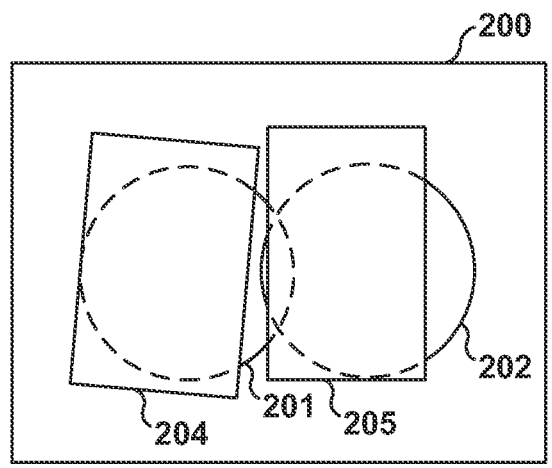
FIG. 2 is a diagram illustrating an example configuration of a wireless power transmission system according to the first embodiment.

FIG. 2 is a diagram illustrating an example configuration of a non-contact charging system (wireless power transmission system) according to the present embodiment. A power transmitting apparatus 200 transmits power to power receiving apparatuses 204 and 205 placed on power transmitting antennas 201 and 202 of the power transmitting apparatus 200 via the power transmitting antenna 201 (corresponding to a first power transmitting antenna 105 described below), the power transmitting antenna 202 (corresponding to a second power transmitting antenna 108 described below), and a power receiving antenna (not illustrated) of the power receiving apparatus.

Hereinafter, the power transmitting apparatus will be referred to as TX, and the power receiving apparatus will be referred to as RX. The TX 200 and the RXs 204 and 205 are compliant with the WPC standard. The RXs 204 and 205 are capable of receiving power from the TX 200 and charging a battery. The TX 200 is an electronic device that wirelessly transmits power to the RXs 204 and 205 placed on the TX 200 (on a charging stand of the TX 200). In the example described below, the RXs 204 and 205 are placed on a power transmitting apparatus. However, as long as the RXs 204 and 205 are within the power-transmittal range of the TX 200, the RXs 204 and 205 do not need to be placed on the TX 200 (on the charging stand of the TX 200) for the TX 200 to transmit power to the RXs 204 and 205.

Also, the RXs 204 and 205 and the TX 200 may have a function of executing an application other than non-contact charging. For example, the RXs 204 and 205 may be smartphones, and the TX 200 may be an accessory device for charging the smartphone. The RXs 204 and 205 and the TX 200 may be tablets, storage apparatuses, such as a hard disk device or a memory device, or may be information processing apparatuses, such as a personal computer (PC) or the like. Also, the RXs 204 and 205 and the TX 200, for example, may be image input apparatuses, such as an image capture apparatus (a camera, a video camera, and the like) or a scanner, or may be image output apparatuses, such as a printer, copying machine, or a projector. Also, the TX 200 may be a smartphone. In this case, the RXs 204 and 205 may be another smartphone or a wireless earphone. Also, the TX 200 may be a charger placed on the console or the like inside the vehicle.

In the present system, wireless power transmission is performed using an electromagnetic induction method for non-contact charging on the basis of the WPC standard. In other words, for the RXs 204 and 205 and the TX 200, wireless power transmission is performed between power receiving antennas of the RXs 204 and 205 and a power transmitting antenna of the TX 200 to perform non-contact charging based on the WPC standard. Note that the wireless power transmission system (non-contact power transmission method) used in the present system is not limited to that defined in the WPC standard, and other systems may be used, such as other electromagnetic induction systems, magnetic field resonance systems, electric field resonance systems, microwave systems, lasers, and the like. Also, in the present embodiment, the non-contact charging uses wireless power transmission. However, wireless power transmission may be used for a different purpose other than for non-contact charging.

In the WPC standard, the magnitude of the power guaranteed when power is received by the RXs 204 and 205 from the TX 200 is defined as a value called guaranteed power (hereinafter, referred to as GP). GP indicates the power value of the guaranteed output to the load (for example, a circuit for charging, a battery, and the like) of the RXs 204 and 205 even when the power transmitting efficiency between the power receiving antenna and the power transmitting antenna decreases due to the positional relationship between the RXs 204 and 205 and the TX 200 changing, for example. For example, in a case where the GP is 5 watts, even when the positional relationship between the power receiving antenna and the power transmitting antenna changes and the power transmitting efficiency is reduced, the TX 200 controls the power transmission in a manner such that 5 watts is output to the load in the RXs 204 and 205.

Also, per the method specified in the WPC standard, the TX 200 detects the existence of an object (foreign object) that is not a power receiving apparatus near the TX 200 (near the power receiving antenna). The methods specifically specified are a power loss method in which a foreign object is detected using the difference between the transmission power of the TX 200 and the reception power of the RXs 204 and 205 and a Q-factor measurement method in which a foreign object is detected using the change in the quality coefficient (Q-factor) of the power transmitting antenna (power transmitting coil) of the TX 200. Foreign object detection using the power loss method is performed during transfer of power (power transmission) (in a Power Transfer phase described below). Also, foreign object detection using the Q-factor measurement method is performed before power transmission (in a Negotiation phase or Renegotiation phase described below).

The RXs 204 and 205 and the TX 200 according to the present embodiment communicate to perform power transmission and reception control based on the WPC standard. The WPC standard defines a plurality of phases including a Power Transfer phase in which power is transmitted and one or more phases before actual power transmission. In these phases, communication is executed to control the transmitting and receiving of power as necessary. Pre-power transmission phases may include a Selection phase, a Ping phase, an Identification and Configuration phase, a Negotiation phase, and a Calibration phase. Note that hereinafter, the Identification and Configuration phase will be referred to as the I&C phase.

In the Selection phase, the TX 200 intermittently transmits an Analog Ping and detects if an object is placed on the TX 200 (for example, if the RXs 204 and 205, a conductor piece, or the like is placed on the charging stand of the TX 200). The TX 200 detects at least a voltage value or a current value of a power transmitting antenna when the Analog Ping is transmitted, determines that an object exists in the case in which the voltage value is less than a threshold or the current value is greater than a threshold, and transitions to the Ping phase.

In the Ping phase, the TX 200 transmits a Digital Ping with more power than the Analog Ping. The magnitude of the power of the Digital Ping is sufficient enough to activate a control unit of the RXs 204 and 205 placed on the TX 200. The RXs 204 and 205 notify the TX 200 of the magnitude of the received voltage. In this manner, by receiving a response from the RXs 204 and 205 that received the Digital Ping, the TX 200 recognizes that the objects detected in the Selection phase are the RXs 204 and 205. When the TX 200 receives a notification of the received voltage value, the process transitions to the I&C phase.

In the I&C phase, the TX 200 identifies the RXs 204 and 205 and obtains device configuration information (capability information) from the RXs 204 and 205. Accordingly, the RXs 204 and 205 transmit an ID Packet and a Configuration Packet to the TX 200. The ID Packet includes the identification information of the RXs 204 and 205, and the Configuration Packet includes the device configuration information (capability information) of the RXs 204 and 205. The TX 200 having received the ID Packet and the Configuration Packet replies with an acknowledge (ACK, affirmative reply). Then, the I&C phase ends.

In the Negotiation phase, the GP value is determined on the basis of the GP value requested by the RXs 204 and 205, the power transmission capability of the TX 200, and the like. Also, the TX 200 executes foreign object detection processing using the Q-factor measurement method in accordance with the request from the RXs 204 and 205. Also, in the WPC standard, a method is specified in which, after the Power Transfer phase has been transitioned to, a similar processing to the Negotiation phase is again executed at the request of the RXs 204 and 205. The phase in which this processing is executed after transitioning from the Power Transfer phase is called the Renegotiation phase.

In the Calibration phase, on the basis of the WPC standard, the RXs 204 and 205 notify the TX 200 of a predetermined reception power value (receiving power value in a light load state/reception power value in a maximum load state), and the TX 200 performs adjustments to efficiently transmit power. The receiving power value the TX 200 is notified of can be used for foreign object detection processing using the power loss method.

In the Power Transfer phase, control is performed to start power transmission, continue power transmission, stop power transmission due to an error or a full charge, and the like. The TX 200 and the RXs 204 and 205 perform communication using the same power transmitting antenna (power transmitting coil) used for wireless power transmission based on the WPC standard, for controlling the transmitting and receiving of power therebetween and superimposing a signal on the electromagnetic waves transmitted from the power transmitting antenna or the power receiving antenna. Note that the communicable range between the TX 200 and the RXs 204 and 205 based on the WPC standard is roughly the same as the power-transmittal range of the TX 200.

Configuration of Power Transmitting Apparatus

Next, the configuration of a power transmitting apparatus according to the present embodiment will be described using FIG. 1. FIG. 1 is a block diagram illustrating an example configuration of the power transmitting apparatus (TX) 100 according to the present embodiment. Note that the configuration described below is simply one example, and a part (or all parts) of the configuration described below may be replaced by other configurations with similar functions, may be omitted, or other configurations may be added in addition to the configurations described below. Furthermore, one block described in the description below may be one block divided into a plurality of blocks or may be a plurality of blocks merged as a single block. Also, for the functional blocks described below, the functions may be configured as software programs. However, a part or all parts included in each functional block may be configured as hardware.

A control unit 101, for example, controls the entire TX 100 by executing a control program stored in a memory 106. Also, the control unit 101 executes control relating to power transmission control including communication for device authentication by the TX 100. Furthermore, the control unit 101 may execute control for executing an application other than wireless power transmission. The control unit 101, for example, includes one or more processors, such as a CPU (Central Processing Unit), an MPU (Micro Processing Unit), or the like. Note that the control unit 101 may be configured as hardware dedicated to specific processing, such as an ASIC (Application Specific Integrated Circuit), or the like. Also, the control unit 101 may include an array circuit such as a FPGA (Field Programmable Gate Array) compiled so as to execute predetermined processing. The control unit 101 causes information stored during the execution of various types of processing to be stored in the memory 106. Also, the control unit 101 is capable of measuring time using a timer (not illustrated).

A power supply unit 102 supplies power to each functional block. The power supply unit 102, for example, is a commercial power supply or a battery. Power supplied from a commercial power supply is stored in the battery.

A first power transmission unit 103 and a second power transmission unit 104 convert direct current or alternating current power input from the power supply unit 102 to alternating current frequency power in a frequency band used for wireless power transmission and generates electromagnetic waves for reception by an RX by inputting the alternating current frequency power into the first power transmitting antenna 105 and the second power transmitting antenna 108, respectively. For example, the first power transmission unit 103 and the second power transmission unit 104 convert DC voltage supplied by the power supply unit 102 to AC voltage at a switching circuit with a half bridge or full bridge configuration using FETs (Field Effect Transistors). In this case, the first power transmission unit 103 and the second power transmission unit 104 each include a gate driver that controls switching the FETs ON and OFF.

Also, the first power transmission unit 103 and the second power transmission unit 104 control the intensity of the electromagnetic waves output by adjusting voltage (power transmission voltage), the current (power transmission current), both the voltage and the current, or the frequency input to the first power transmitting antenna 105 and the second power transmitting antenna 108. If power transmission voltage or power transmission current is increased, the intensity of electromagnetic waves is increased, and if power transmission voltage or power transmission current is decreased, the intensity of electromagnetic waves is decreased. In addition, on the basis of an instruction from the control unit 101, the first power transmission unit 103 and the second power transmission unit 104 perform output control of the alternating current frequency power to start or stop power transmission from first power transmitting antenna 105 and the second power transmitting antenna 108. Also, the first power transmission unit 103 and the second power transmission unit 104 have the capability to supply power corresponding to outputting 15 watts (W) of power to each charging unit of an RX compatible with the WPC standard.

The first power transmission unit 103 and the second power transmission unit 104 each include a not-illustrated communication unit. The first power transmission unit 103 and the second power transmission unit 104 perform communication with the RX for power transmission control based on the WPC standard as described above via the communication unit. The communication unit performs communication including modulating the electromagnetic waves output from the first power transmitting antenna 105 and the second power transmitting antenna 108 and transmitting information to the RX. Also, the communication unit demodulates the electromagnetic waves output from the first power transmitting antenna 105 and the second power transmitting antenna 108 and modulated at the RX and obtains the information transmitted by the RX. In other words, communication performed by the communication unit is performed by superimposition of a signal on electromagnetic waves transmitted from the first power transmission unit 103 and the second power transmission unit 104. Also, the communication unit may communicate with the RX via communication using a standard other than the WPC standard using an antenna other than the first power transmitting antenna 105 and the second power transmitting antenna 108, or the communication unit may communicate with the RX selectively using a plurality of communications.

The memory 106 may store the control program as well as the state of the TX 100 and the RX (RXs 204 and 205) (receiving power value and the like). For example, the state of the TX 100 may be obtained by the control unit 101, the state of the RX may be obtained by a control unit of the RX, and these may be received via the communication units.

The first power transmitting antenna 105 and the second power transmitting antenna 108 may each include a plurality of antennas (coils). A selection unit 107 is capable of exclusively selecting either the first power transmission unit 103 or the second power transmission unit 104 or selecting both. The selected power transmission unit is able to receive power supply from the power supply unit 102 and transmit power via the power transmitting antenna. On the other hand, the non-selected power transmission unit is unable to receive power supply from the power supply unit 102 and transmit power via the power transmitting antenna. Note that in FIG. 1, two power transmission units and two power transmitting antennas are illustrated. However, the number of these components is not limited to two.

Figure 5:
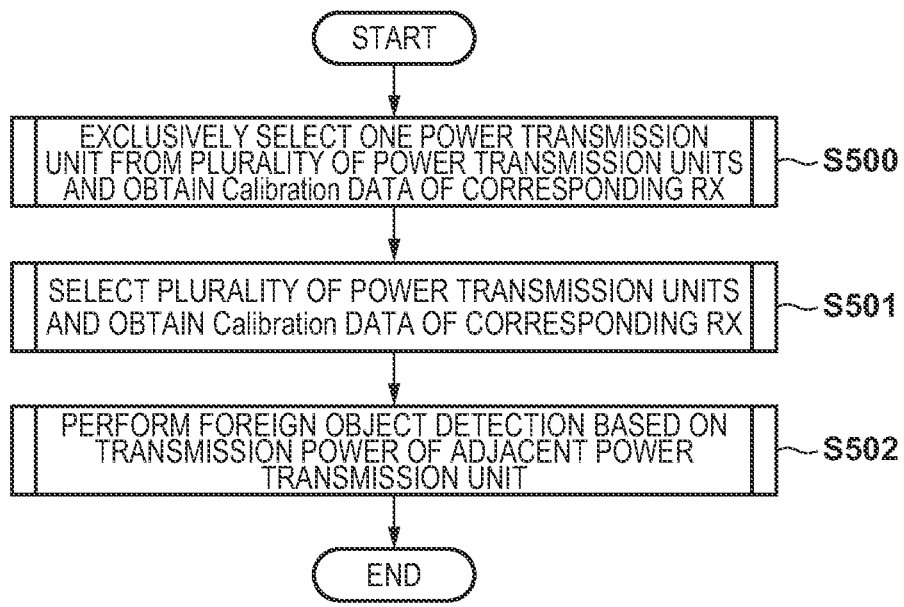
FIG. 5 is a diagram of the processing flow of a power transmitting apparatus according to the first embodiment.

Calibration Process when Simultaneously Transmitting Power to a Plurality of Power Receiving Apparatuses Next, a Calibration process when one power transmitting apparatus transmits power to a plurality of power receiving apparatuses via a plurality of power transmission units and power transmitting antennas will be described using FIGS. 3A to 3D, 4, and 5. FIGS. 3A to 3D are diagrams for describing a foreign object detection method according to the present embodiment. FIG. 4 is a conceptual diagram of the conditions for obtaining Calibration data. FIG. 5 is a processing flow of the power transmitting apparatus (TX 100) according to the present embodiment. In the following examples, the configuration of the wireless power transmission system illustrated in FIG. 2 is used.

Figure 3A:
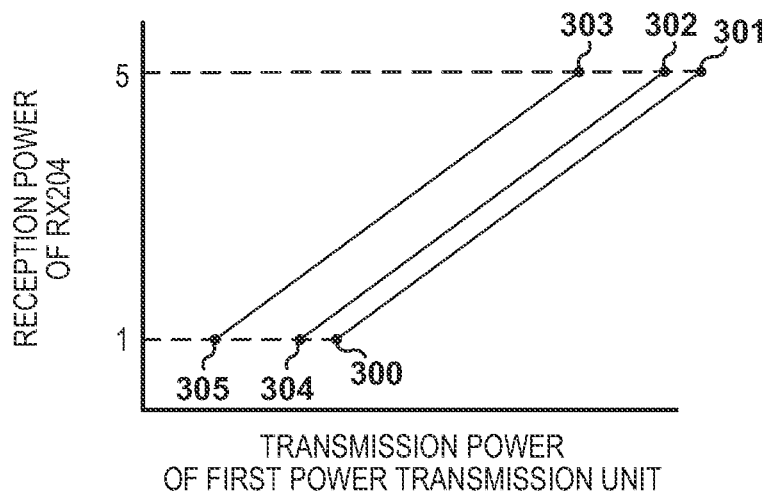
FIG. 3A is a diagram for describing a foreign object detection method.
Figure 3B:
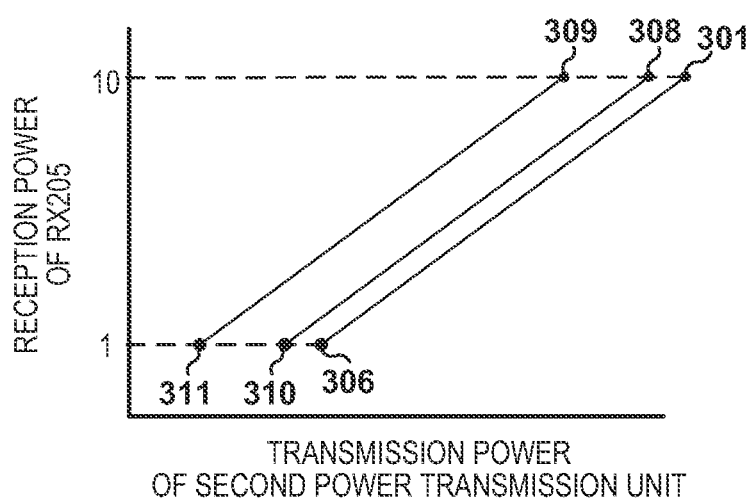
FIG. 3B is a diagram for describing a foreign object detection method.

Step S500: Exclusively Selecting One Power Transmission Unit from a Plurality of Power Transmission Units and Obtaining Calibration Data of the Corresponding RX FIG. 3A is a diagram illustrating Calibration data when the first power transmission unit 103 transmits power to the RX 204. The transmission power of the first power transmission unit 103 is represented on the horizontal axis. The reception power of the RX 204 is represented on the vertical axis. FIG. 3B is a diagram illustrating Calibration data when the second power transmission unit 104 transmits power to the RX 205. The transmission power of the second power transmission unit 104 is represented on the horizontal axis. The reception power of the RX 205 is represented on the vertical axis. In the present embodiment, the straight line (straight line 602 in FIG. 6 for example) used in the foreign object detection method based on the power loss method is referred to as Calibration data. Also, in the present embodiment, the Light Load power of the RX 204 is 1 W, and the Connected Load power is 5 W. Also, the Light Load power of the RX 205 is 1 W, and the Connected Load power is 10 W.

First, the selection unit 107 selects only the first power transmission unit 103. The selected first power transmission unit 103 transmits a Digital Ping and activates the RX 204. Here, the second power transmission unit 104 has not been selected, and thus the RX 205 is not activated. Then, the control unit 101 obtains the Light Load transmission power value of the RX 204 and stores this in the memory 106 (point 300). Next, the control unit 101 obtains the Connected Load transmission power value of the RX 204 and stores this in the memory 106 (point 301). Accordingly, the TX 100 exclusively selects the first power transmission unit 103 from the plurality of power transmission units and obtains the Calibration data (a straight line joining the point 300 and the point 301) for the corresponding RX 204.

Next, the selection unit 107 selects only the second power transmission unit 104. The selected second power transmission unit 104 transmits a Digital Ping and activates the RX 205. Here, the first power transmission unit 103 has not been selected, and thus the RX 204 is not activated. Then, the control unit 101 obtains the Light Load transmission power value of the RX 205 and stores this in the memory 106 (point 306). Next, the control unit 101 obtains the Connected Load transmission power value of the RX 205 and stores this in the memory 106 (point 307). Accordingly, the TX 100 exclusively selects the second power transmission unit 104 from the plurality of power transmission units and obtains the Calibration data (a straight line joining the point 306 and the point 307) for the corresponding RX 205.

Step S501: Selecting a Plurality of Power Transmission Units and Obtaining Calibration data of the Corresponding RXs After finishing obtaining the Calibration data when one power transmission unit is exclusively selected from the plurality of power transmission units, the control unit 101 selects the plurality of power transmission units and obtains the Calibration data of the corresponding RXs.

Here, the majority of the power transmitted by the first power transmission unit 103 is received by the RX 204, and a small amount is received by the RX 205. Thus, when the plurality of power transmission units (the first power transmission unit 103 and the second power transmission unit 104) simultaneously transmit power, the control unit 101 is required to correct the Calibration data (the straight line joining the point 300 and the point 301) obtained in step S500. In a similar manner, the majority of the power transmitted by the second power transmission unit 104 is received by the RX 205, and a small amount is received by the RX 204. Thus, when the plurality of power transmission units simultaneously transmit power, the control unit 101 is required to correct the Calibration data (the straight line joining the point 306 and the point 307) obtained in step S500.

FIG. 4 is a conceptual diagram illustrating the conditions for obtaining the Calibration data necessary for performing correction. In FIG. 4, combinations of Light Load and Connected Load for all of the RXs are illustrated. Specifically, as there are two RXs, the RX 204 and the RX 205, four combinations are illustrated.

First, the selection unit 107 selects all of the power transmission units (in this case, the first power transmission unit 103 and the second power transmission unit 104) for power transmission to the power receiving apparatuses (in other words, the RX 204 and the RX 205). Then, the control unit 101 obtains the transmission power value of the first power transmission unit 103 when (condition 1) the reception power of the RX 204 is 1 W (Light Load) and the reception power of the RX 205 is 10 W (Connected Load) and stores this in the memory 106 (point 305). Here, by comparing the point 300 and the point 305, it can be seen that, though both points are at 1 W for the reception power of the RX 204, there is a difference in the transmission power value of the first power transmission unit 103. This is because when the RX 204 receives 1 W, some power is also received from the second power transmission unit 104 adjacent to the first power transmission unit 103. In other words, the transmission power of the first power transmission unit 103 when the point 305 is obtained is less than that when the point 300 is obtained by the amount that the RX 204 receives from the second power transmission unit 104.

Next, the control unit 101 obtains the transmission power value of the second power transmission unit 104 when (condition 1) the reception power of the RX 204 is 1 W (Light Load) and the reception power of the RX 205 is 10 W (Connected Load) and stores this in the memory 106 (point 308). The transmission power of the second power transmission unit 104 when the point 308 is obtained is less than that when the point 307 is obtained because, the RX 205 also receives some power from the first power transmission unit 103 adjacent to the second power transmission unit 104 when receiving 10 W of power.

Then, the control unit 101 obtains the transmission power value of the first power transmission unit 103 when (condition 3) the reception power of the RX 204 is 5 W (Connected Load) and the reception power of the RX 205 is 1 W (Light Load) and stores this in the memory 106 (point 302). Next, the control unit 101 obtains the transmission power value of the second power transmission unit 104 when (condition 3) the reception power of the RX 204 is 5 W (Connected Load) and the reception power of the RX 205 is 1 W (Light Load) and stores this in the memory 106 (point 311).

Then, the control unit 101 obtains the transmission power value of the first power transmission unit 103 when (condition 4) the reception power of the RX 204 is 1 W (Light Load) and the reception power of the RX 205 is 1 W (Light Load) and stores this in the memory 106 (point 304). Next, the control unit 101 obtains the transmission power value of the second power transmission unit 104 when (condition 4) the reception power of the RX 204 is 1 W (Light Load) and the reception power of the RX 205 is 1 W (Light Load) and stores this in the memory 106 (point 310).

Last, the control unit 101 obtains the transmission power value of the first power transmission unit 103 when (condition 2) the reception power of the RX 204 is 5 W (Connected Load) and the reception power of the RX 205 is 10 W (Connected Load) and stores this in the memory 106 (point 303). Next, the control unit 101 obtains the transmission power value of the second power transmission unit 104 when (condition 2) the reception power of the RX 204 is 5 W (Connected Load) and the reception power of the RX 205 is 10 W (Connected Load) and stores this in the memory 106 (point 309).

Then, obtaining the Calibration data necessary for correcting the Calibration data obtained in step S500 ends. Specifically, the straight line joining the points 305 and 303 in FIG. 3A corresponds to the Calibration data of the first power transmission unit 103 when the transmission power of the second power transmission unit 104 is 10 W, and the straight line joining the points 304 and 302 corresponds to the Calibration data of the first power transmission unit 103 when the transmission power of the second power transmission unit 104 is 1 W. In a similar manner, the straight line joining the points 311 and 309 in FIG. 3B corresponds to the Calibration data of the second power transmission unit 104 when the transmission power of the first power transmission unit 103 is 5 W, and the straight line joining the points 310 and 308 corresponds to the Calibration data of the second power transmission unit 104 when the transmission power of the first power transmission unit 103 is 1 W.

Step S502: Performing Foreign Object Detection on the basis of Transmission Power of Adjacent Power Transmission Unit After the Calibration data necessary for correction has finished being obtained in step S501, the control unit 101 performs foreign object detection on the basis of the obtained Calibration data.

Foreign Object Detection using First Power Transmission Unit

Figure 3C:
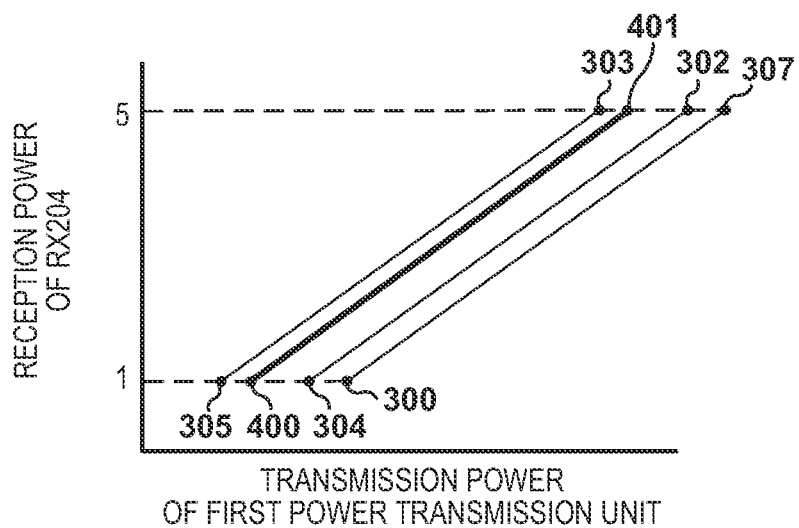
FIG. 3C is a diagram for describing a foreign object detection method.

Next, foreign object detection using the first power transmission unit 103 (for the first power transmission unit 103) will be described using FIG. 3C. When performing foreign object detection using the first power transmission unit 103, first, the control unit 101 obtains the transmission power value of the second power transmission unit 104 at this point in time. Note that the transmission power of the second power transmission unit at this time is taken to be 6 W. Next, the control unit 101 obtains the Calibration data when the transmission power of the second power transmission unit 104 is 6 W. Specifically, data is interpolated for the transmission power of the second power transmission unit 104 at 10 W (the point 305), 1 W (the point 304), and 0 W (the point 300) when the transmission power of the first power transmission unit 103 is 1 W (Light Load). Here, the control unit 101 performs linear interpolation of two points, the point 304 (when the transmission power of the second power transmission unit 104 is 1 W) and the point 305 (same but 10 W) and obtains a point 400 as the transmission power value of the first power transmission unit 103 when the transmission power of the second power transmission unit 104 is 6 W. In a similar manner, the control unit 101 performs linear interpolation of two points, the point 302 (when the transmission power of the second power transmission unit 104 is 1 W) and the point 303 (same but 10 W) when the transmission power of the first power transmission unit 103 is 5 W (Connected Load) and obtains a point 401 as the transmission power value of the first power transmission unit 103 when the transmission power of the second power transmission unit 104 is 6 W. The straight line joining the points 400 and 401 corresponds to the Calibration data of the first power transmission unit 103 when the transmission power of the second power transmission unit 104 is 6 W. The control unit 101 uses the obtained Calibration data to perform foreign object detection based on the power loss method as described above.

Foreign Object Detection using Second Power Transmission Unit

Figure 3D:
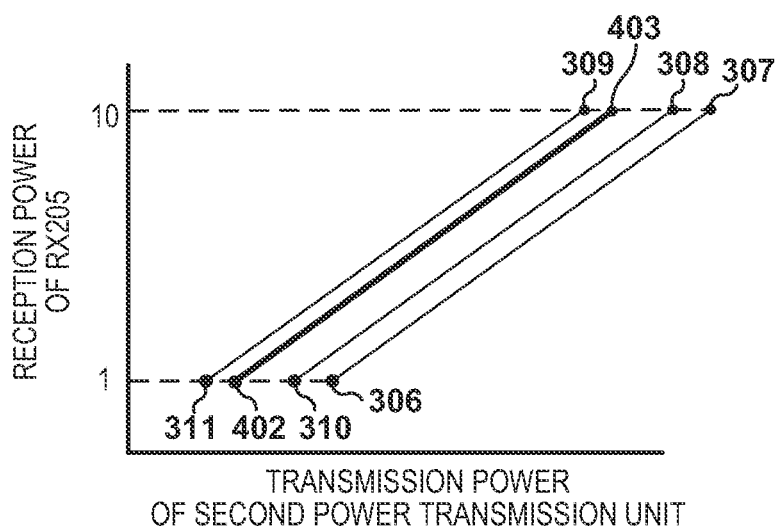
FIG. 3D is a diagram for describing a foreign object detection method.

Next, foreign object detection using the second power transmission unit 104 (for the second power transmission unit 104) will be described using FIG. 3D. In a similar manner to the foreign object detection using the first power transmission unit 103, the control unit 101 obtains the Calibration data when the transmission power of the second power transmission unit 104 on the basis of the transmission power of the first power transmission unit 103. Note that the transmission power of the first power transmission unit 103 is taken to be 4 W. The control unit 101 performs linear interpolation of two points, the point 310 (when the transmission power of the first power transmission unit 103 is 1 W) and the point 311 (same but 5 W) and obtains a point 402 as the transmission power value of the second power transmission unit 104 when the transmission power of the first power transmission unit 103 is 4 W. In a similar manner, the control unit 101 performs linear interpolation of two points, the point 308 (when the transmission power of the first power transmission unit 103 is 1 W) and the point 309 (same but 5 W) when the transmission power of the second power transmission unit 104 is 10 W (Connected Load) and obtains a point 403 as the transmission power value of the second power transmission unit 104 when the transmission power of the first power transmission unit 103 is 6 W. The straight line joining the points 402 and 403 corresponds to the Calibration data of the second power transmission unit 104 when the transmission power of the first power transmission unit 103 is 4 W. The control unit 101 uses the obtained Calibration data to perform foreign object detection based on the power loss method as described above.

In this manner, the power transmitting apparatus according to the present embodiment is capable of improved foreign object detection even when simultaneously transmitting power to a plurality of power receiving apparatuses.

Note that at least a part of the processing illustrated in the flowchart of FIG. 5 may be implemented by hardware. In the case of implementing processing by hardware, for example, using a predetermined compiler, the processing can be implemented by automatically generating a dedicated circuit on an FPGA from a program for implementing the steps. FPGA stands for a field programmable gate array. In addition, similarly to an FPGA, a gate array circuit may be formed and implemented as hardware.

Second Embodiment

Next, the second embodiment will be described in which power transmitting apparatus and the power receiving apparatus each have a communication function using BLE (Bluetooth (registered trademark) Low Energy).

System Configuration

Figure 9A:
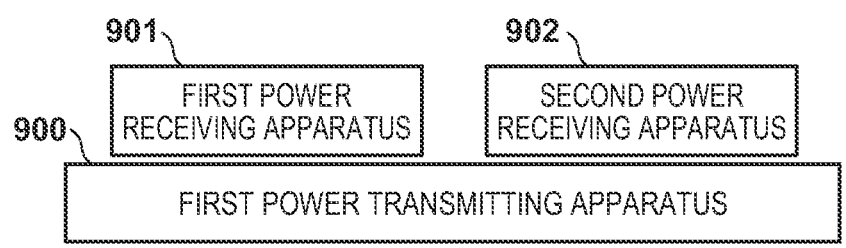
FIG. 9A is a diagram illustrating an example configuration of a wireless power transmission system according to the second embodiment.
Figure 9B:
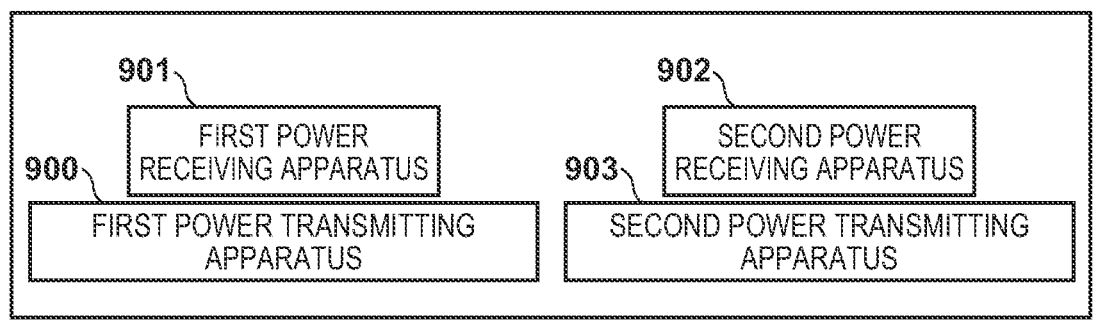
FIG. 9B is a diagram illustrating an example configuration of the wireless power transmission system according to the second embodiment.

FIGS. 9A and 9B are diagrams illustrating examples of the configuration of a wireless power transmission system according to the present embodiment. The wireless power transmission of the present embodiment includes power transmitting apparatuses (a first power transmitting apparatus 900 and a second power transmitting apparatus 903) and power receiving apparatuses (first power receiving apparatus 901 and second power receiving apparatus 902). Note that the power transmitting apparatuses and the power receiving apparatuses each have a communication function using BLE. Hereinafter, a BLE communication unit (unit configured of an antenna, communication circuit, and the like) may be referred to as a "BLE unit".

In this embodiment, the first power transmitting apparatus 900 and the second power transmitting apparatus 903 function as the BLE Central, and the first power receiving apparatus 901 and the second power receiving apparatus 902 function as the BLE Peripheral. "Central" means the BLE control station, and "Peripheral" means the BLE terminal station. The BLE Central communicates with the BLE Peripheral, but does not communicate with other Centrals. Also, the BLE Peripheral communicates with the BLE Central, but does not communicate with other Peripherals. In other words, in BLE, Centrals do not communicate with one another and Peripherals do not communicate with one another. Also, the Central is capable of being in a connected state (BLE CONNECT_State) with the plurality of Peripherals and capable of transmitting and receiving data to and from the plurality of Peripherals. On the other hand, the Peripheral is only capable of being in a connected state with one Central and cannot communicate in parallel with the plurality of Centrals.

The first power transmitting apparatus 900 of FIG. 9A includes at least two power transmitting circuits and is capable of simultaneously charging the first power receiving apparatus 901 and the second power receiving apparatus 902. FIG. 9B is a diagram illustrating the first power transmitting apparatus 900 charging the first power receiving apparatus 901 and the second power transmitting apparatus 903 with the same configuration as the first power transmitting apparatus 900 charging the second power receiving apparatus 902. The first power transmitting apparatus 900 and the second power receiving apparatus 902 are located adjacent to one another, and the first power transmitting apparatus 900 is capable of communicating using BLE with the first power receiving apparatus 901 and the second power receiving apparatus 902. Also, the second power transmitting apparatus 903 is capable of communicating using BLE with the first power receiving apparatus 901 and the second power receiving apparatus 902.

The BLE unit (Peripheral) of the first power receiving apparatus 901 is capable of only connecting to one Central. Thus, for communication to control power transmission between the first power transmitting apparatus 900 and the first power receiving apparatus 901 to be performed using BLE, the BLE unit (Peripheral) of the first power receiving apparatus 901 needs to be in a connected state with only the BLE unit (Central) of the first power transmitting apparatus 900. This is because, when the BLE unit (Peripheral) of the first power receiving apparatus 901 is in a connected state with another Central such as the second power transmitting apparatus 903 or the like, the BLE unit (Peripheral) becomes unable to perform control communication with the BLE unit (Central) of the first power transmitting apparatus 900. In a similar manner, for communication to control power transmission between the second power transmitting apparatus 903 and the second power receiving apparatus 902 to be performed using BLE, the BLE unit (Peripheral) of the second power receiving apparatus 902 needs to be in a connected state with only the BLE unit (Central) of the second power transmitting apparatus 903. Thus, the BLE unit (Peripheral) of the second power receiving apparatus 902 should not be in a connected state with another Central such as the first power transmitting apparatus 900 or the like.

In this manner, control communication should be performed between a power transmitting apparatus and a power receiving apparatus (for example, the first power transmitting apparatus 900 and the first power receiving apparatus 901) that perform power transmission and reception. However, when the communication range of outbound communication is larger than the inbound communication range, the power transmitting apparatus and the power receiving apparatus may establish a connection for outbound communication with a device that is not the target for power transmission and reception. The establishment of a connection for outbound communication with a device that is not the target for power transmission and reception is called cross connection. For example, in FIG. 9B, the state in which the first power receiving apparatus 901 and the second power transmitting apparatus 903 connect via BLE is a cross connection.

In FIG. 9B, when the first power transmitting apparatus 900 uses BLE (outbound communication) for control communication, unless there is confirmation of a BLE connection with the first power receiving apparatus 901 within the power transmission and reception range (in other words, is the target for power transmission), power transmission to charge the battery of the first power receiving apparatus 901, negotiation relating to power, and the like should not be performed. This is because, if the first power transmitting apparatus 900 establishes a BLE connection with the second power receiving apparatus 902 and performs control communication with the first power receiving apparatus 901 as the power transmission target, the power transmission target (the first power receiving apparatus 901) and the control communication partner apparatus (the second power receiving apparatus 902) may be different. In this case, the first power transmitting apparatus 900 is unable to appropriately perform control communication for the first power receiving apparatus 901. In a similar manner, when the first power receiving apparatus 901 also uses control communication using BLE (outbound communication), unless there is confirmation of a BLE connection with the first power transmitting apparatus 900 within the power transmission and reception range, power reception to charge the battery from the first power transmitting apparatus 900, negotiation relating to power, and the like should not be performed. This is because, if the first power receiving apparatus 901 establishes a BLE connection with the second power transmitting apparatus 903 and performs control communication with the first power transmitting apparatus 900 as the power reception source, the power reception source (the first power transmitting apparatus 900) and the control communication partner apparatus (the second power transmitting apparatus 903) may be different. In this case, the first power receiving apparatus 901 is unable to appropriately perform control communication with the first power transmitting apparatus 900.

In the wireless power transmission system illustrated in FIGS. 9A and 9B, it is important that the power transmitting apparatus and the power receiving apparatus both obtain confirmation that control communication using BLE is possible with the partner apparatus in the power transmission and reception range before power transmission and reception to charge the battery. Thus, in the present embodiment, a connection using BLE between the power transmitting apparatus and the power receiving apparatus and the wireless power transmission partner apparatus can be established. Note that BLE is used as an example, and a discretionary wireless communication method able to be used for outbound communication in wireless power transmission can be used. Also, hereinafter, the executed wireless power transmission is compliant with the WPC standard, and the WPC standard used herein includes the functions specified in version 1.2.2. Note that in the present embodiment described below, the power transmitting apparatus and the power receiving apparatus are compliant with the WPC standard. However, no such limitation is intended, and another wireless power transmission standard may be used. Examples of the configuration of the power transmitting apparatus and the power receiving apparatus and the flow of executed processing will now be described.

Apparatus Configuration

Figure 7:
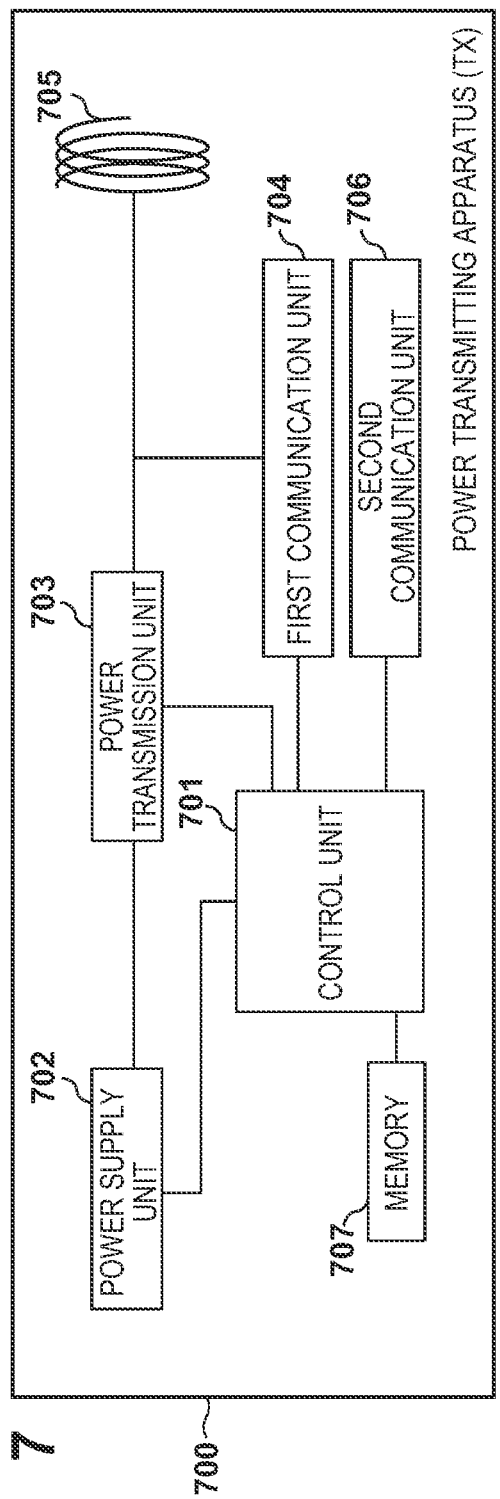
FIG. 7 is a block diagram illustrating an example configuration of a power transmitting apparatus according to a second embodiment.

FIG. 7 is a block diagram illustrating an example configuration of a power transmitting apparatus 700 (for example, the first power transmitting apparatus 900 and the second power transmitting apparatus 903) according to the present embodiment. The power transmitting apparatus 700, for example, includes a control unit 701, a power supply unit 702, a power transmission unit 703, a first communication unit 704, a power transmitting coil 705, a second communication unit 706, and a memory 707.

The control unit 701 controls the entire power transmitting apparatus 700. The control unit 701, for example, includes one or more processors, such as a CPU (Central Processing Unit), an MPU (Micro Processing Unit), or the like. Note that the control unit 701 is configured to execute the processing described below and may include an ASIC (Application Specific Integrated Circuit), FPGA (Field-Programmable Gate Array), or the like.

The power supply unit 702 is a power supply for supplying power when at least the control unit 701 and the power transmission unit 703 are operating. The power supply unit 702 may be a wired power receiving circuit, battery, or the like that receives power supply from a commercial power supply, for example. The power transmission unit 703 transmits power to the power receiving apparatus via the power transmitting coil 705 to cause the power transmitting coil 705 to generate an AC voltage and an alternating current. For example, the power transmission unit 703 converts DC voltage supplied by the power supply unit 702 to AC voltage at a switching circuit with a half bridge or full bridge configuration using FETs. In this case, the power transmitting unit 703 includes a gate driver that controls switching the FETs ON and OFF.

The first communication unit 704 performs control communication for wireless power transmission based on the WPC standard with a communication unit (a first communication unit 804 illustrated in FIG. 8) of a power receiving apparatus. In the present embodiment, the communication executed by the first communication unit 704 is so-called inbound communication including modulating the AC voltage or current generated by the power transmission unit 703 and superimposing communication target data on the wireless power.

The second communication unit 706 performs control communication for wireless power transmission based on the WPC standard with a communication unit (a second communication unit 802 illustrated in FIG. 8) of a power receiving apparatus. The second communication unit 706 performs so-called outbound communication including using a different frequency to the frequency of the power transmission unit 703 and a different not-illustrated antenna to the power transmitting coil 705. In the present embodiment, the second communication unit 706 is compatible with BLE. However, instead of this, a communication unit that is compatible with another wireless communication method, such as NFC, WiFi, or the like, may be used. The memory 707 stores each factor of the power transmitting apparatus and the wireless power transmission system and the overall state.

In FIG. 7, the control unit 701, the power supply unit 702, the power transmission unit 703, the first communication unit 704, the memory 707, and the second communication unit 706 are each illustrated as individual blocks. However, two or more of these blocks may be combined on one chip or the like. Also, one block may be divided into a plurality of blocks.

Figure 8:
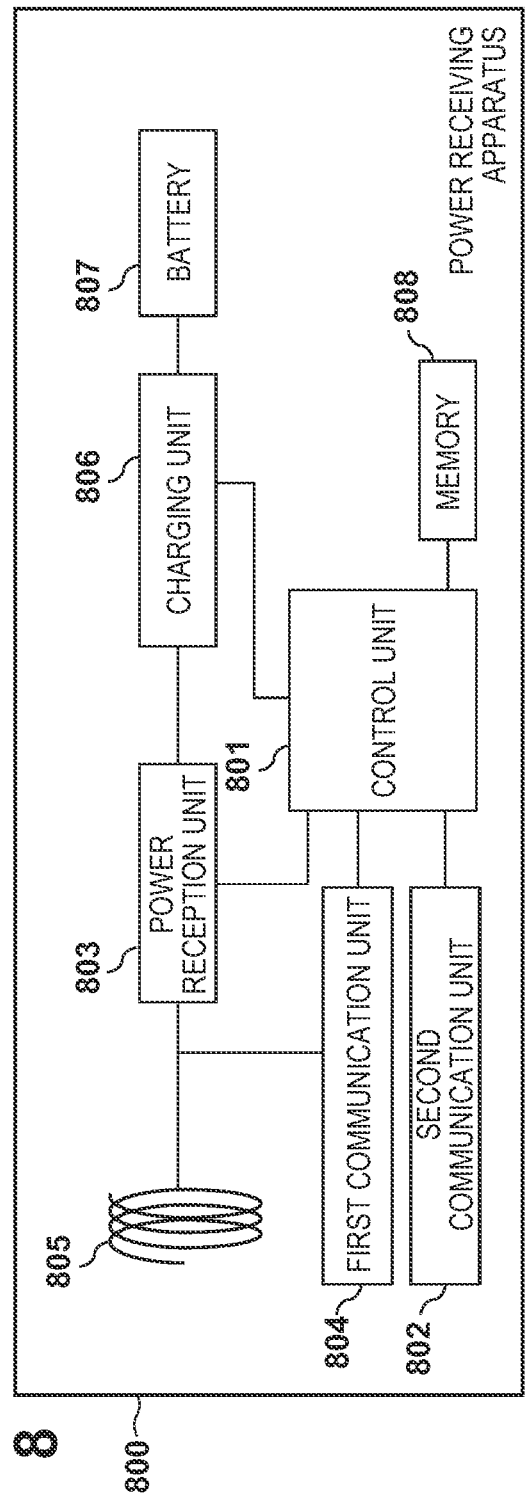
FIG. 8 is a block diagram illustrating an example configuration of a power receiving apparatus according to a second embodiment.

FIG. 8 is a block diagram illustrating an example configuration of a power receiving apparatus 800 (for example, the first power receiving apparatus 901 and the second power receiving apparatus 902) according to the present embodiment. The power receiving apparatus, for example, includes a control unit 801, a power reception unit 803, the first communication unit 804, a second communication unit 802, a power receiving coil 805, a charging unit 806, a battery 807, and a memory 808.

The control unit 801 controls the entire power receiving apparatus 800. The control unit 801, for example, includes one or more processors, such as a CPU (Central Processing Unit), an MPU (Micro Processing Unit), or the like. Note that the control unit 801 is configured to execute the processing described below and may include an ASIC (Application Specific Integrated Circuit), FPGA (Field-Programmable Gate Array), or the like.

The power reception unit 803 obtains the AC voltage and the alternating current generated at the power receiving coil 805 by power transmission from the power transmitting coil 705 and converts them to DC voltage and direct current to operate the control unit 801, the charging unit 806, and the like that receive power. The first communication unit 804 performs control communication for wireless power transmission based on the WPC standard with the first communication unit 704 of the power transmitting apparatus. The control communication is performed via inbound communication including load modulation of electromagnetic waves received at the power receiving coil 805.

The second communication unit 802 performs control communication for wireless power transmission based on the WPC standard with the second communication unit 706 of the power transmitting apparatus. The second communication unit 802 performs outbound communication including using a different frequency to the frequency of the electromagnetic waves received by the power reception unit 803 and a different not-illustrated antenna to the power receiving coil 805. In the present embodiment, the second communication unit 802 is compatible with BLE. The data transmitted by the second communication unit 802 is transmitted together with a Bluetooth Device Address (hereinafter, referred to as BD_ADDR), which is an identifier of the second communication unit 802. Herein, in the BD_ADDR, the Random Address configured of a Public Address, which is a unique identifier of the communication unit, and a random number are specified in the BLE standard. In the present embodiment described herein, the second communication unit 802 uses the Random Address. In a similar manner, the second communication unit 706 of the power transmitting apparatus also uses the Random Address.

Also, in the embodiment described herein, the second communication unit 802 is compliant with BLE. However, instead of this, a communication unit that is compatible with another wireless communication method, such as NFC, WiFi, or the like, may be used. Also, the second communication unit 802 may receive power supply from the battery 807 and may receive a direct power supply from the power reception unit 803.

The charging unit 806 uses the DC voltage and the direct current supplied from the power reception unit 803 and charges the battery 807. The memory 808 stores each factor of the power receiving apparatus and the wireless power transmission system and the overall state.

In FIG. 8, the control unit 801, the power reception unit 803, the first communication unit 804, the second communication unit 802, the charging unit 806, and the memory 808 are each illustrated as individual blocks. However, two or more of these blocks may be combined on one chip or the like. Also, one block may be divided into a plurality of blocks.

Processing Flow

Next, examples of the flow of the basic processing of the overall system according to the present embodiment will be described, and then examples of the flow of the processing executed by each apparatus will be described. Thereafter, examples of the advantageous processing of the overall system according to the present embodiment will be described.

Flow of Basic Processing of Overall System

FIG. 10A is a diagram illustrating an example of the basic processing of the overall system as an operation sequence of a wireless power transmission system according to the present embodiment. In the following description, the first power transmitting apparatus 900 and the first power receiving apparatus 901 will be used as examples. In FIG. 10A, the first power transmitting apparatus 900 first executes the processing of the Selection phase and the Ping phase described above. In the Selection phase, the first power transmitting apparatus 900 transmits an Analog Ping via the power transmitting coil 705 (F1000). An Analog Ping is a very small amount of power used to detect an object existing near the power transmitting coil 705. The first power transmitting apparatus 900 detects a voltage value or a current value of the power transmitting coil when the Analog Ping is transmitted, determines that an object exists when the voltage value is less than a threshold or the current value is greater than a threshold, and transitions to the Ping phase. Then, in the Ping phase, the first power transmitting apparatus 900 transmits a Digital Ping with more power than the Analog Ping (F1001). Herein, a Digital Ping includes sufficient power to activate the control unit 801, the first communication unit 804, and the second communication unit 802 of the first power receiving apparatus 901 located near the power transmitting coil 705. When the control unit 801 and the first communication unit 804 of the first power receiving apparatus 901 are activated by the Digital Ping received via the power receiving coil 805, the first power transmitting apparatus 900 is notified of the magnitude of the reception voltage via inbound communication using the first communication unit 804 (F1002). When the first power transmitting apparatus 900 receives a notification of the reception voltage value via the first communication unit 704, the processing of the Ping phase ends, and the I&C phase is transitioned to. In the I&C phase, the first power transmitting apparatus 900 receives an ID Packet (Identification Packet) transmitted via the first power receiving apparatus 901 (F1003). At this time, the first power transmitting apparatus 900 may at least obtain the individual identification information (hereinafter, referred to as ID) of the first power receiving apparatus 901. For example, the first power transmitting apparatus 900, with the ID Packet, obtains the identification information used in the WPC standard by the first power receiving apparatus 901 and confirms whether or not an EXT bit indicating that there is additional ID information is "1". Then, when the EXT bit is "1", the first power transmitting apparatus 900 obtains the additional ID information via an Extended Identification (ID) Packet transmitted as a follow up in accordance with the WPC standard (F1004).

Also, in the I&C phase, the first power transmitting apparatus 900 also receives a Configuration Packet transmitted via the first power receiving apparatus 901 (F1005). In the present embodiment, using 1 bit in the Configuration Packet, a BLE bit is transmitted that indicates whether or not the first power receiving apparatus 901, which is the transmission source of the packet, is compatible with outbound control communication using BLE.

The first power transmitting apparatus 900 can determine whether or not the first power receiving apparatus 901 has a control communication function using BLE by monitoring this bit (BLE bit). Also, in the present embodiment, another bit in the Configuration Packet is used to transmit a BLE Enable bit indicating whether the first power receiving apparatus 901 can use BLE control communication at that point in time.

Then, the first power transmitting apparatus 900 transmits an ACK (acknowledge) via inbound communication in response to receiving the Configuration Packet (F1006). When the ACK is transmitted, the first power transmitting apparatus 900 then transitions to the Negotiation phase.

Next, the first power receiving apparatus 901 uses a General Request packet specified in the WPC standard as a packet that is transmitted when any kind of request is sent to the first power transmitting apparatus 900 and transmit a General Request (Capability) for obtaining the capability information of the first power transmitting apparatus 900 (F1007).

When the first power transmitting apparatus 900 receives a General Request (Capability), the first power transmitting apparatus 900 transmits a Tx Capability, which is its own capability information, to the first power receiving apparatus 901 (F1008). The Tx Capability includes the individual identification information of the first power transmitting apparatus 900 and information indicating whether the first power transmitting apparatus 900 is compatible with outbound control communication using BLE. By receiving a Tx Capability, the first power receiving apparatus 901 can know that the first power transmitting apparatus 900 is compatible with outbound control communication using BLE.

Next, the first power receiving apparatus 901 uses a Specific Request packet specified by the WPC standard as a packet for transmitting a request to the power transmitting apparatus and performs negotiation relating to the magnitude of the reception power (F1009). The magnitude of the reception power is referred to in the WPC standard as Guaranteed Power (hereinafter, referred to as GP). In the present embodiment, a packet used in negotiation is referred to as a Specific Request (GP). When the first power transmitting apparatus 900 can permit the Specific Request (GP) transmitted by the first power receiving apparatus 901, the first power transmitting apparatus 900 transmits an ACK (F1010). Next, the first power receiving apparatus 901 generates a random number to use as the BLE Random Address and then transmits the generated Random Address as the BD_ADDR to the first power receiving apparatus 901 (F1011). Here, since the BD_ADDR is a random number, there is a possibility that it overlaps with the BD_ADDR of another BLE compatible device that uses a Random Address.

Though described below in more detail, the first power transmitting apparatus 900 determines whether there is overlap with the BD_ADDR of another BLE compatible device received via the second communication unit 706. Then, the first power transmitting apparatus 900 transmits an ACK to the first power receiving apparatus 901 if there is no overlap. Otherwise, the first power transmitting apparatus 900 transmits a NAK to the first power receiving apparatus 901. Note that though also described below, in a similar manner, the first power receiving apparatus 901 also determines whether the BD_ADDR of another BLE compatible device received via the second communication unit 802 overlaps with the BD_ADDR of the first power transmitting apparatus 900. Then, the first power receiving apparatus 901 transmits an ACK to the first power transmitting apparatus 900 if there is no overlap. Otherwise, the first power receiving apparatus 901 transmits a NAK to the first power transmitting apparatus 900. The first power transmitting apparatus 900 transmits an ACK indicating that there is no overlap (F1012). At this point in time, the first power transmitting apparatus 900 can associated together and store the individual identification information of the first power receiving apparatus 901 obtained via the ID Packet and the BD_ADDR.

Next, the first power receiving apparatus 901 requests the BD_ADDR of the first power transmitting apparatus 900. Here, the first power receiving apparatus 901 for the request transmits a General Request (BD_ADDR) as a request for a BD_ADDR from the General Request packet (F1013). When the first power transmitting apparatus 900 receives the General Request (BD_ADDR), the first power transmitting apparatus 900 generates its own BD_ADDR and transmits the BD_ADDR to the first power receiving apparatus 901 (F1014).

The first power receiving apparatus 901 determines whether there is overlap between the BD_ADDR of the first power transmitting apparatus 900 and the BD_ADDR of another BLE compatible device received via the second communication unit 802. Then, the first power receiving apparatus 901 transmits an ACK to the first power transmitting apparatus 900 if there is no overlap. Otherwise, the first power receiving apparatus 901 transmits a NAK to the first power transmitting apparatus 900. The first power receiving apparatus 901 transmits an ACK indicating that there is no overlap (F1015). At this point in time, the first power receiving apparatus 901 can associated together and store the individual identification information of the first power transmitting apparatus 900 obtained via the Tx Capability (F1008) and the BD_ADDR.

When the BD_ADDR exchange ends, the first power transmitting apparatus 900 attempts control communication using BLE with the first power receiving apparatus 901 by activating its BLE communication function as a Scanner. Note that a Scanner is one state defined in the BLE standard in which an ADVERTISE_INDICATION broadcast by the first power receiving apparatus 901 is received and the BLE device (or service) that is the transmission source is discovered. Hereinafter, ADVERTISE_INDICATION is referred to as ADV_IND. The ADV_IND is a signal that is broadcast by a device in an Advertiser state as defined by the BLE standard for communicating the BD_ADDR of the device and compatible service information.

The first power receiving apparatus 901 activates the first communication unit 804 as an Advertiser. Then, the first power receiving apparatus 901 broadcasts the BD_ADDR and the ADV_IND storing information indicating compatibility with the wireless power transmission service based on the WPC standard (F1016). When the first power transmitting apparatus 900 receives the ADV_IND, the first power transmitting apparatus 900 transmits a BLE connection request message to the received BD_ADDR. The connection request message is a CONNECT_REQ (hereinafter, referred to as "CONNECT") specified by the BLE standard (F1017).

With a BLE connection established, then the first power transmitting apparatus 900 and the first power receiving apparatus 901 perform control of the wireless power transmission compliant with the WPC standard using outbound control communication using BLE. Though a detailed description is omitted, as described above, for example, the first power transmitting apparatus 900 and the first power receiving apparatus 901 executes the Calibration processing necessary to detect metal foreign objects (foreign object detection) near the power transmitting and receiving apparatuses (F1018).

When the Calibration processing ends, the first power transmitting apparatus 900 and the first power receiving apparatus 901 transition to the Power Transfer phase and perform control of power transmission and reception to charge the battery 807 (F1019). When charging ends, the first power receiving apparatus 901 transmits, to the first power receiving apparatus 901, an End Power Transfer (EPT) packet specified by the WPC standard which is a packet for stopping power transmission (F1020). Then, the first power receiving apparatus 901 transmits an LL_TERMINATE_IND defined by the BLE standard which is a packet indicating disconnection of the BLE connection connected via the CONNECT to the first power transmitting apparatus 900, which is the transmission source of the CONNECT (F1021). Hereinafter, LL_TERMINATE_IND is referred to as "TERMINATE". This concludes the description of the flow of the basic processing of the overall system.

Operation of Power Transmitting Apparatus

Figure 11A:
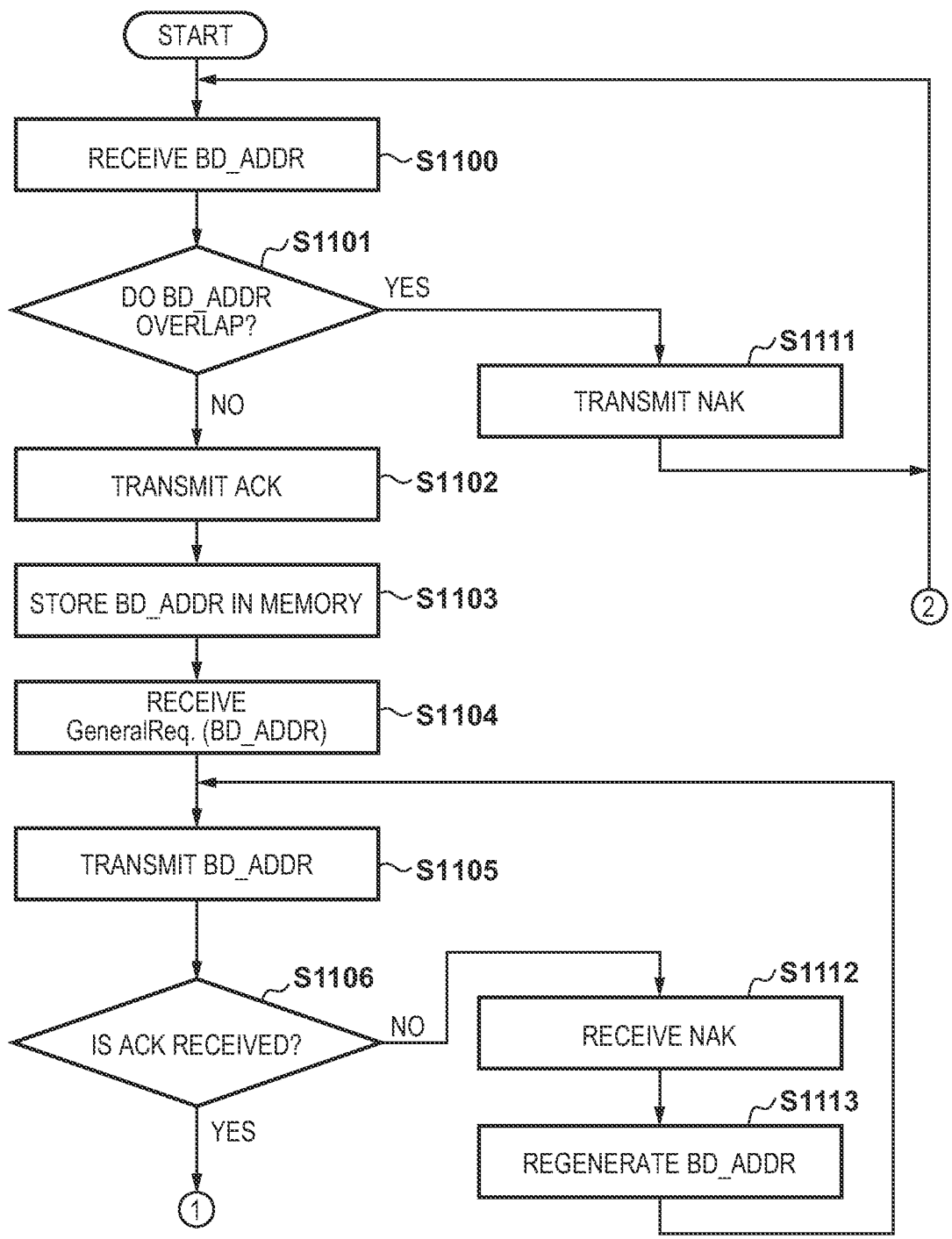
FIG. 11A is a diagram of the processing flow of a power transmitting apparatus according to the second embodiment.
Figure 11B:
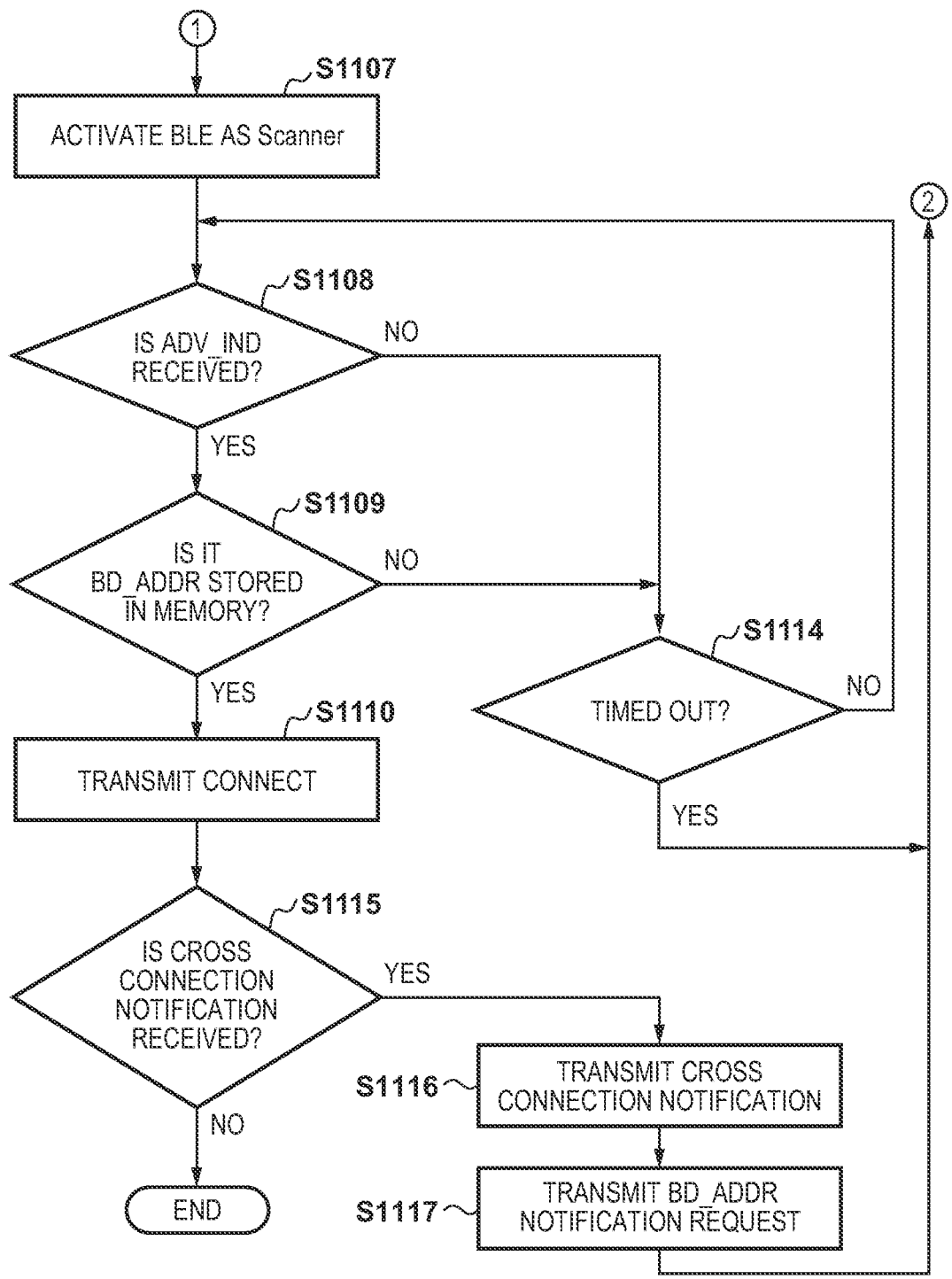
FIG. 11B is a diagram of the processing flow of the power transmitting apparatus according to the second embodiment.

An example of processing to detect and resolve cross connection, which is part of the processing executed by the power transmitting apparatus (the first power transmitting apparatus 900), will be described below using FIGS. 11A and 11B. FIGS. 11A and 11B are diagrams illustrating the processing flow of the power transmitting apparatus according to the present embodiment. Note that the present processing may be started in response to the power transmission unit 703 being activated by being supplied with power by receiving a power supply from the power supply unit 702, for example. Also, the present processing may be implemented by the control unit 701 executing a program stored in the memory 707. However, no such limitation is intended, and the present processing may be executed in response to the power transmission function being activated by an operation such as the user pressing down a predetermined button on the power transmitting apparatus, for example. Also, at least a part of the processing illustrated in FIGS. 11A and 11B may be implemented by hardware. When at least a part of the processing is implemented by hardware, for example, a dedicated circuit automatically generated on the FPGA using a predetermined compiler from a program for implementing a processing step. Also, in a similar manner to the FPGA, hardware for executing a predetermined processing step may be implemented using a Gate Array circuit.

When the first power transmitting apparatus 900 receives a BD_ADDR from the first power receiving apparatus 901 (step S1100), the first power transmitting apparatus 900 confirms whether it overlaps with the BD_ADDR already stored in the memory 707 (step S1101). Here, the ID of the power receiving apparatus obtained by the first power transmitting apparatus 900 and the BD_ADDR are associated together and stored in the memory 707. For example, when the BD_ADDR of the power receiving apparatus with an ID of "A" is "X" and the BD_ADDR of another power receiving apparatus with an ID of "B" is also "X", the first power transmitting apparatus 900 determines that the BD_ADDRs are overlapped and there is the danger of cross connection.

When the BD_ADDRs are overlapped (Yes in step S1101), the first power transmitting apparatus 900 transmits a NAK to the first power receiving apparatus 901 (step S1111). A NAK means that the BD_ADDRs are overlapped. In other words, a NAK corresponds to a notification indicating that the BD_ADDRs are overlapped, a request to regenerate the BD_ADDR, or a request to notify the first power transmitting apparatus 900 of the regenerated BD_ADDR. Thereafter, the first power transmitting apparatus 900 receives the BD_ADDR regenerated by the first power receiving apparatus 901 (step S1101). When the BD_ADDRs are not overlapped (No in step S1101), the ACK transmitted by the first power transmitting apparatus 900 to the first power receiving apparatus 901 (step S1102) means that the BD_ADDRs are not overlapped. Then, the first power transmitting apparatus 900 associates the ID received via the Configuration Packet of F1005 in FIG. 10A with the BD_ADDR are stores the BD_ADDR in the memory 707 (step S1103).

When the first power transmitting apparatus 900 receives the General Request (BD_ADDR) from the first power receiving apparatus 901 (step S1104), the first power transmitting apparatus 900 generates its own BD_ADDR and transmits the BD_ADDR to the first power receiving apparatus 901 (step S1105). Then, the first power transmitting apparatus 900 determine whether an ACK has been received (step S1106). When an ACK is not received (No in step S1106) and a NAK is received (step S1112), the first power transmitting apparatus 900 regenerates the BD_ADDR (step S1113) and re-transmits the BD_ADDR (step S1105). When an ACK is received (Yes in step S1106), the first power transmitting apparatus 900 activates BLE as a Scanner (step S1107). After BLE activation, when an ADV_IND is received (Yes in step S1108), if the ADV_IND indicates the BD_ADDR held in the memory 707 and the ADV_IND includes information indicating compatibility with a wireless power transmission service based on the WPC standard (Yes in step S1109), the first power transmitting apparatus 900 transmits a CONNECT to the ADV_IND (step S1110).

Here, the received ADV_IND indicating the BD_ADDR held in the memory 707 means that the transmission source of the ADV_IND has a high probability of being the power receiving apparatus that exchanged BD_ADDRs using inbound communication via the first communication unit 704. "High probability" is caused by there being a possibility that the BD_ADDR overlaps with another power receiving apparatus that uses a Random Address as the BD_ADDR due to the BD_ADDR being a Random Address, but there being a high possibility that the random numbers do not overlap.

When the ADV_IND is not received (No in step S1108) or the BD_ADDR received via the ADV_IND is different from the BD_ADDR held in the memory 707 (No in step S1109), the first power transmitting apparatus 900 confirms whether the timer has timed out. Here, the timer starts at the point in time when the BLE is activated as a Scanner, or the point in time when the BD_ADDR is received in step S1105, or the point in time when the ACK is received in step S1106 and sets the time until the ADV_IND including the BD_ADDR held in the memory 707 is received. When the time has not timed out (No in step S1114), the first power transmitting apparatus 900 attempts to receive the ADV_IND (step S1108). When the time has timed out (Yes in step S1114), the first power transmitting apparatus 900 ends the Scanner operations and returns to the processing of step S1100.

After CONNECT transmission, the first power transmitting apparatus 900 determines whether a BLE cross connection notification has been received from the power receiving apparatus via the second communication unit 706 (step S1115). Here, when the power receiving apparatus that has received the CONNECT and established a communication connection using BLE with the first power transmitting apparatus 900 is not to power transmission and reception target, the cross connection notification is sent by the power receiving apparatus to the first power transmitting apparatus 900 and indicates that the established BLE connected is not appropriate for control communication. The first power transmitting apparatus 900 may receive the cross connection notification via the second communication unit 706. When a cross connection notification is received (Yes in step S1115), this means that the first power transmitting apparatus 900 does not have a BLE connection with the power receiving apparatus that is the target for power transmission and reception using the actual BLE connection. Specifically, this means that the BD_ADDR (Random Address) of the transmission source of the received ADV_IND is the BD_ADDR held in the memory 707, but the power receiving apparatus is not that which is the power transmission target communicating via inbound communication. This is an event that may occur when a Random Address is used for the BD_ADDR.

Here, the first power transmitting apparatus 900 transmits, via the first communication unit 704, the cross connection notification to the power receiving apparatus (the first power receiving apparatus 901) which is the actual target for BLE connection using inbound communication (step S1116) and transmits, to the first power receiving apparatus 901, a BD_ADDR notification request requesting for regeneration and notification of the BD_ADDR (step S1117). Thereafter, the regenerated BD_ADDR with a different value is received from the first power receiving apparatus 901 (step S1100). Also, when a cross connection notification is not received (No in step S1115), this means that the first power transmitting apparatus 900 has a BLE connection with the power receiving apparatus (the first power receiving apparatus 901) which is the actual BLE connection target. In this case, the processing ends.

Operation of Power Receiving Apparatus

Figure 12A:
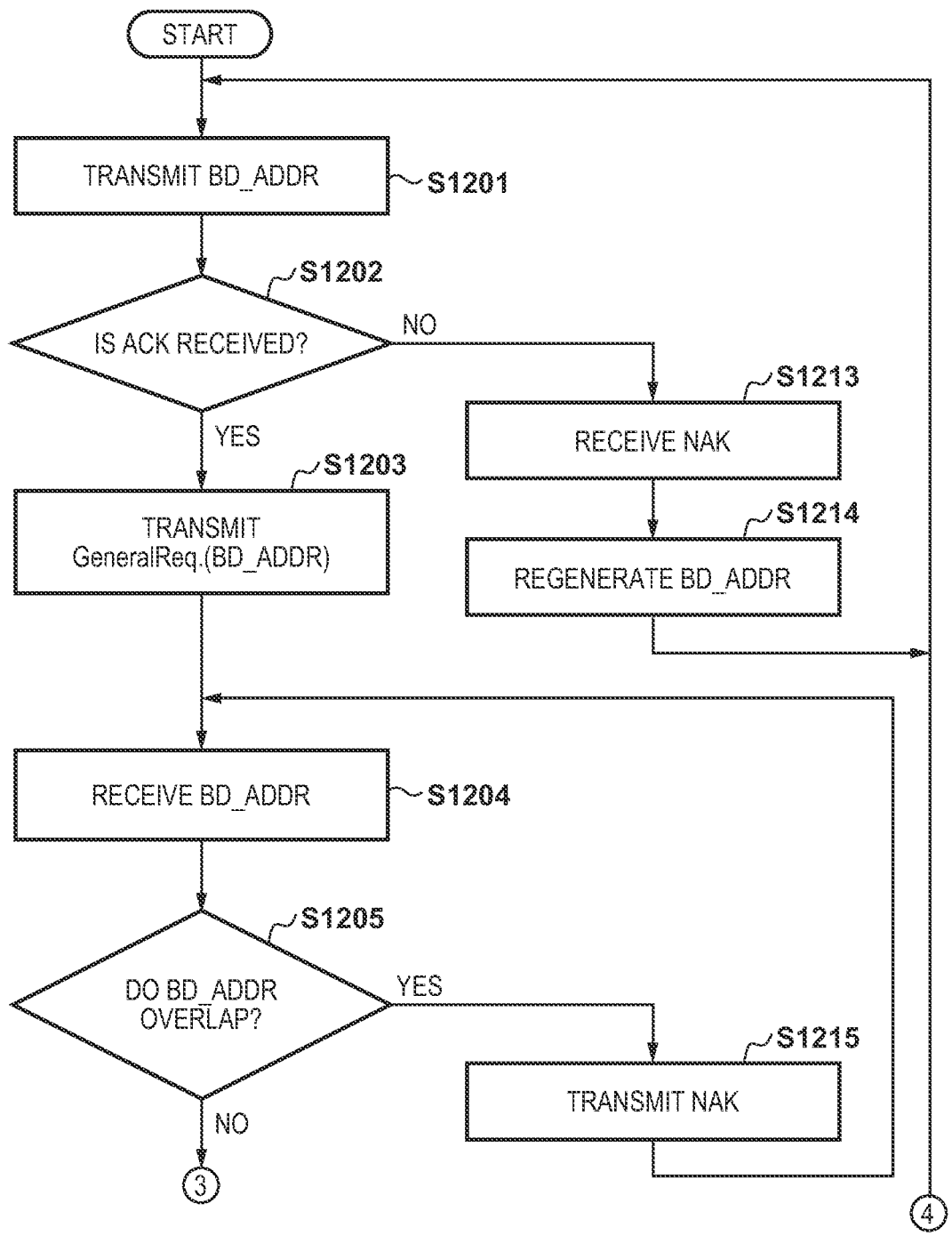
FIG. 12A is a diagram of the processing flow of a power receiving apparatus according to the second embodiment.

An example of processing to detect and resolve cross connection, which is part of the processing executed by the power receiving apparatus (the first power receiving apparatus 901), will be described below using FIGS. 12A and 12B. FIGS. 12A and 12B are diagrams illustrating the processing flow of the power receiving apparatus according to the present embodiment. Note that the present processing may be started in response to the control unit 801 being activated by being supplied with power by receiving a power supply from the power reception unit 803 for example. Also, the present processing may be implemented by the control unit 801 executing a program stored in the memory 808. However, no such limitation is intended, and the present processing may be executed in response to the power transmission function being activated by an operation such as the user pressing down a predetermined button on the power receiving apparatus, for example. Also, at least a part of the processing illustrated in FIGS. 12A and 12B may be implemented by hardware. When at least a part of the processing is implemented by hardware, for example, a dedicated circuit automatically generated on the FPGA using a predetermined compiler from a program for implementing a processing step. Also, in a similar manner to the FPGA, hardware for executing a predetermined processing step may be implemented using a Gate Array circuit.

The first power receiving apparatus 901 transmits a BD_ADDR to the first power transmitting apparatus 900 via the first communication unit 804 (step S1201). When the first power receiving apparatus 901 does not receive an ACK from the first power transmitting apparatus 900 via the first communication unit 804 (No in step S1202) and receives a NAK (step S1213), the first power receiving apparatus 901 regenerates the BD_ADDR (step S1214) and transmits the regenerated BD_ADDR (step S1201).

When an ACK is received (Yes in step S1202), the first power receiving apparatus 901 transmits a General Request (BD_ADDR) to the first power receiving apparatus 901 via the first communication unit 804 (step S1203). Then, the first power receiving apparatus 901 receives the BD_ADDR from the first power transmitting apparatus 900 (step S1204) and confirms whether the BD_ADDR overlaps with the BD_ADDR held in the memory 808. When the BD_ADDRs are overlapped (Yes in step S1205), the first power receiving apparatus 901 transmits a NAK to the first power transmitting apparatus 900 via the first communication unit 804 (step S1215), and the first power transmitting apparatus 900 receives the regenerated BD_ADDR (step S1204). In other words, a NAK corresponds to a request to regenerate the BD_ADDR and notify the first power receiving apparatus 901.

When the BD_ADDRs are not overlapped (No in step S1205), the first power receiving apparatus 901 transmits an ACK to the first power transmitting apparatus 900 (step S1206) and associates the received BD_ADDR with the individual identification information (ID) of the first power transmitting apparatus 900 received in F1008 in FIG. 10A and stores them in the memory 808 (step S1207).

The first power receiving apparatus 901 transmits via broadcast the stored ADV_IND as the transmission source address of the BD_ADDR transmitted in step S1201 (step S1208). When the CONNECT is received (step S1209), the first power receiving apparatus 901 confirms whether the transmission source address of the CONNECT is the BD_ADDR held in the memory 808 in step S1207 (step S1210). When the transmission source address of the CONNECT is the BD_ADDR held in the memory 808 (Yes in step S1210), this means that the first power receiving apparatus 901 has a BLE connection with the first power transmitting apparatus 900 which is the target for power transmission and reception, and thus the processing ends. Otherwise, (No in step S1210), it means that the first power receiving apparatus 901 has a BLE connection to an apparatus other than the first power transmitting apparatus 900 which is the target for power transmission and reception. Thus, a cross connection notification is transmitted via the second communication unit 802 (step S1200), a TERMINATE is transmitted (step S1212), and then the processing returns to step S1201.

Also, when the CONNECT is not received (No in step S1209), the first power receiving apparatus 901 confirms whether the timer has timed out (step S1211). Here, the timer starts at the point in time when the BD_ADDR is received in step S1204, or the point in time when the ACK is received in step S1206 and sets the time until the CONNECT including the BD_ADDR held in the memory 808 is received. When the time has not timed out (No in step S1211), the first power receiving apparatus 901 attempts to receive the CONNECT (step S1209). When the time has timed out (Yes in step S1211), the first power transmitting apparatus 900 ends the Advertiser operations and returns to the processing of step S1201.

Figure 10B:
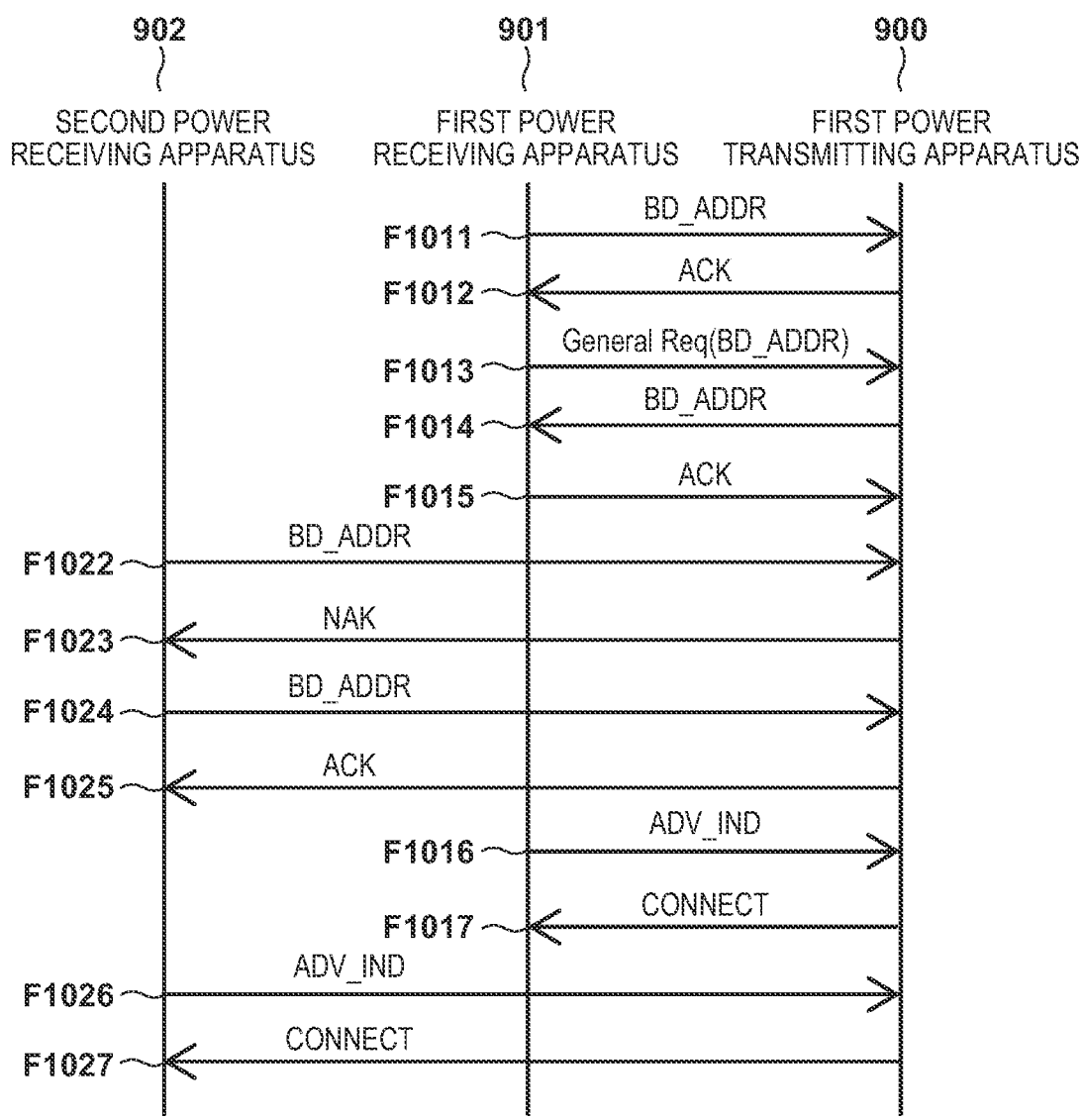
FIG. 10B is an operation sequence diagram of the wireless power transmission system according to the second embodiment.

Advantageous Flow of Processing of Overall System according to Present Embodiment Cross Connection between a Plurality of Power Receiving Apparatuses placed on one Power Transmitting Apparatus A method for resolving cross connection when the first power receiving apparatus 901 and the second power receiving apparatus 902 are placed on the first power transmitting apparatus 900 as illustrated in FIG. 9A will be described using FIG. 10B. FIG. 10B is an operation sequence diagram of the wireless power transmission system according to the present embodiment. In the following description, the first power transmitting apparatus 900, the first power receiving apparatus 901, and the second power receiving apparatus 902 will be used as examples. In the example of FIG. 10B described herein, the BD_ADDR of the first power receiving apparatus 901 and the BD_ADDR of the second power receiving apparatus 902 are overlapped. In this case, the first power transmitting apparatus 900 charges the first power receiving apparatus 901 via a not-illustrated first power transmitting circuit and charges the second power receiving apparatus 902 via a not-illustrated second power transmitting circuit. Note that configurations already described in relation to FIG. 10A are given the same reference sign and descriptions thereof are omitted.

The second power receiving apparatus 902 notifies the first power transmitting apparatus 900 of its own BD_ADDR via the first communication unit 804 (F1022). Since the BD_ADDR of the second power receiving apparatus 902 is the same as that of the first power receiving apparatus 901 received in F1011, the first power transmitting apparatus 900 transmits a NAK to the second power receiving apparatus 902 (F1023). After reception of the NAK, the second power receiving apparatus 902 transmits a regenerated BD_ADDR to the first power transmitting apparatus 900 (F1024). Because the BD_ADDR has been regenerated, the first power transmitting apparatus 900 transmits an ACK to the second power receiving apparatus 902 (F1025).

In this manner, when the BD_ADDR of a plurality of power receiving apparatuses placed on one power transmitting apparatus overlap with one another, the power transmitting and receiving apparatuses can avoid cross connection. Furthermore, according to operations of the present example, cross connection can be prevented before it happens.

Figure 10C:
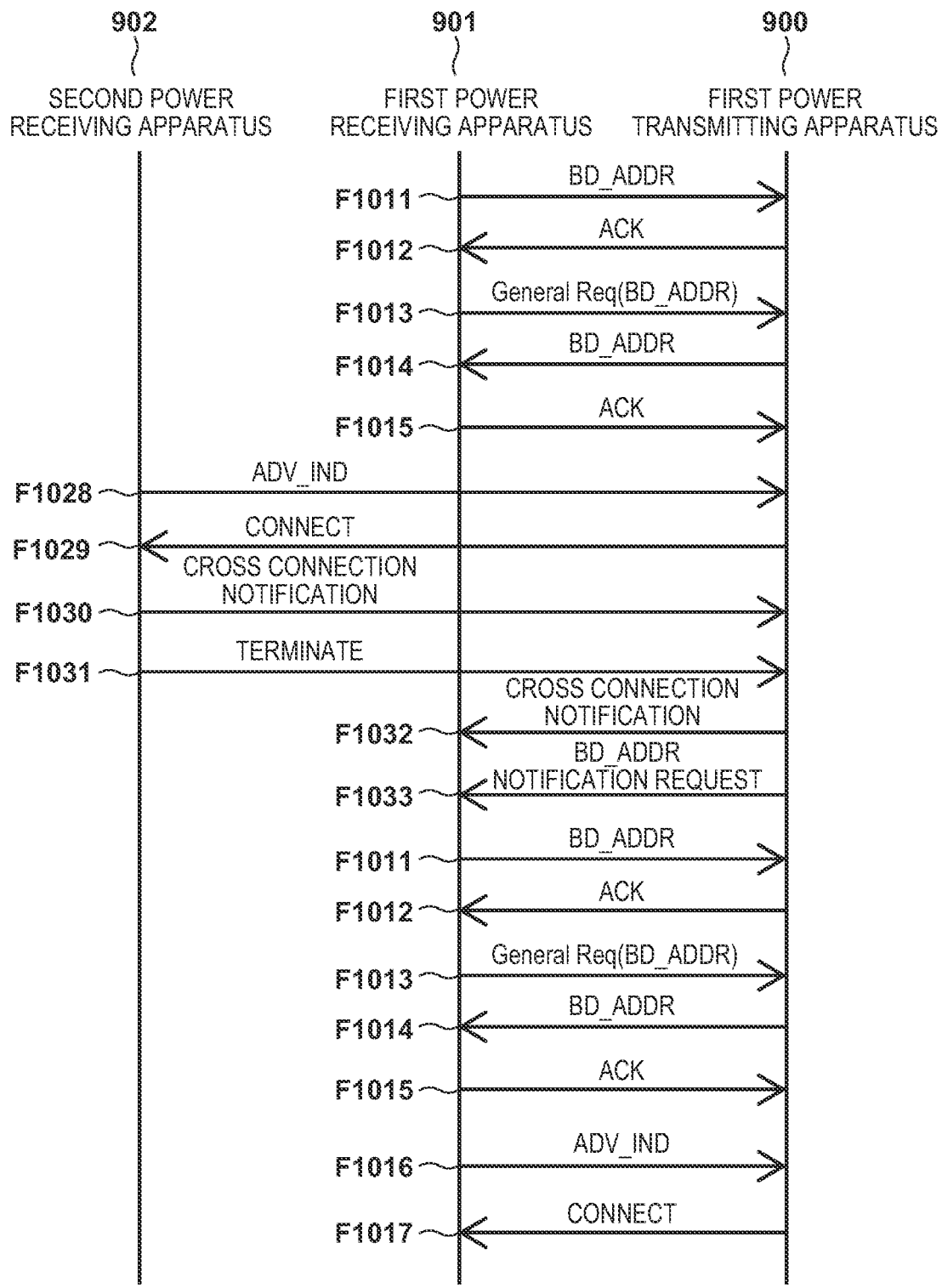
FIG. 10C is an operation sequence diagram of the wireless power transmission system according to the second embodiment.

Cross Connection between Power Receiving Apparatuses placed on adjacent Power Transmitting Apparatuses A method for avoiding cross connection between power receiving apparatuses placed adjacent power transmitting apparatuses as illustrated in FIG. 9B will be described using FIG. 10C. FIG. 10C is an operation sequence diagram of the wireless power transmission system according to the present embodiment. In the following description, the first power transmitting apparatus 900, the first power receiving apparatus 901, and the second power receiving apparatus 902 will be used as examples. In the example of FIG. 10C, as illustrated in FIG. 9B, the first power receiving apparatus 901 is placed on the first power transmitting apparatus 900 and the second power receiving apparatus 902 is placed on the second power transmitting apparatus 903 and the BD_ADDRs of the first power receiving apparatus 901 and the second power receiving apparatus 902 are overlapped. Note that configurations already described in relation to FIG. 10A are given the same reference sign and descriptions thereof are omitted.

When the second power receiving apparatus 902 receives the BD_ADDR of the not-illustrated second power transmitting apparatus 903 via the first communication unit 804, the second power receiving apparatus 902 broadcasts an ADV_IND (F1028). Here, the first power transmitting apparatus 900 transmits a CONNECT to the ADV_IND before the second power transmitting apparatus 903 does (F1029). When the second power receiving apparatus 902 receives the CONNECT, the second power receiving apparatus 902 transmits a cross connection notification (F1030) and a TERMINATE (F1031) to the first power transmitting apparatus 900 via the second communication unit 706.

When the first power transmitting apparatus 900 receives the cross connection notification and the TERMINATE, the first power transmitting apparatus 900 transmits the cross connection notification (F1032) and the BD_ADDR notification request (F1033) to the first power receiving apparatus 901 via the first communication unit 704. Thereafter, the first power transmitting apparatus 900 and the first power receiving apparatus 901 establish a BLE connection in accordance with the processing from F1011 to F1017 described above. Also, though not illustrated, the second power receiving apparatus 902, in accordance with the flow of FIGS. 12A and 12B, after transmission of the TERMINATE (step S1212 of FIG. 12B and F1031), re-transmits the BD_ADDR to the second power transmitting apparatus 903 via the first communication unit 804 (step S1201).

Also, as described above, before the second power transmitting apparatus 903 transmits the CONNECT to the ADV_IND, the first power transmitting apparatus 900 has transmitted the CONNECT and the second power receiving apparatus 902 has stopped the transmission of the ADV_IND. Thus, the timer times out with the second power transmitting apparatus 903 receiving the ADV_IND (Yes in step S1114), and thus the second power transmitting apparatus 903 re-receives the BD_ADDR from the second power receiving apparatus 902 via the first communication unit 704. The BD_ADDR of the first power receiving apparatus 901 is changed due to being regenerated, and thus cross connection does not occur. Thus, the second power transmitting apparatus 903 and the second power receiving apparatus 902 establish a BLE connection in accordance with the processing from F1011 to F1017 described above.

First Modified Example

Figure 10D:
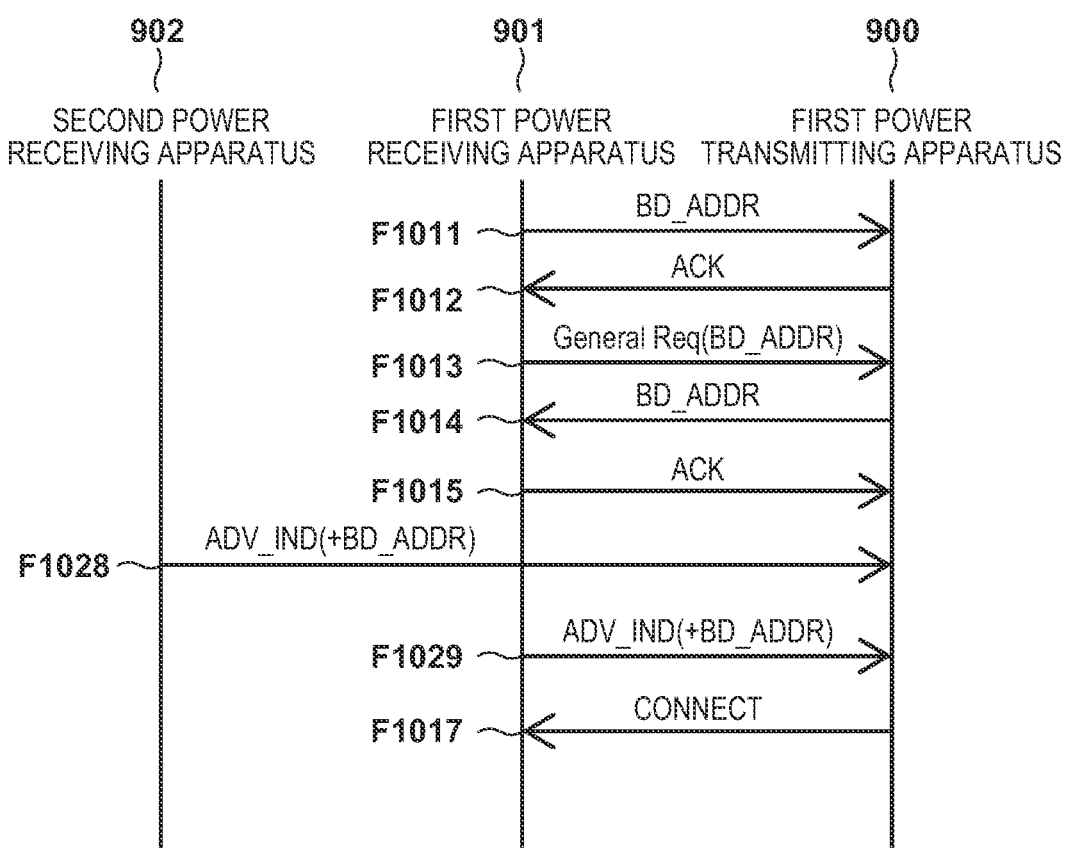
FIG. 10D is an operation sequence diagram of the wireless power transmission system according to the second embodiment.

In the example of FIG. 10C, the power receiving apparatus determines that there is cross connection on the basis of the BD_ADDR of the power transmitting apparatus included in the CONNECT and the BD_ADDR received by the power receiving apparatus via the first communication unit 804. However, instead of this, the power transmitting apparatus may make a determination using the BD_ADDR of the power receiving apparatus included in the ADV_IND and other identification information. An example of this determination will be described using FIG. 10D. FIG. 10D is an operation sequence diagram of a wireless power transmission system according to the present modified example. In the following description, the first power transmitting apparatus 900, the first power receiving apparatus 901, and the second power receiving apparatus 902 will be used as examples. Note that configurations already described in relation to FIG. 10A are given the same reference sign and descriptions thereof are omitted.

The power receiving apparatus of the first modified example inserts the BD_ADDR of the power transmitting apparatus received via the first communication unit 804 into the ADV_IND as an information factor. For example, the second power receiving apparatus 902 stores the BD_ADDR of the second power transmitting apparatus 903 in the ADV_IND as an information factor and transmits this (F1028). In the present modified example, this is referred to as ADV_IND (+BD_ADDR).

The first power transmitting apparatus 900 receives the ADV_IND (+BD_ADDR) from the second power receiving apparatus 902 via a broadcast, but the BD_ADDR of the power transmitting apparatus is that of the second power transmitting apparatus 903 and is different to the BD_ADDR of the first power transmitting apparatus 900. Thus, the first power transmitting apparatus 900 does not transmit a CONNECT. Then, when the first power transmitting apparatus 900 receives the ADV_IND (+BD_ADDR) transmitted by the first power receiving apparatus 901 (F1029), the BD_ADDR of the power transmitting apparatus is that of the first power transmitting apparatus 900, and thus a CONNECT is transmitted (F1017).

In this manner, since the BD_ADDR of the partner device corresponding to the target for power transmission and reception is stored in the ADV_IND, cross connection can be avoided. Note that the packet storing the address of the Central that allows connection in the ADV_IND is defined as ADV_DIRECT_IND in the BLE standard.

Also, if identification information additionally stored in the ADV_IND is the identification information known by the power transmitting apparatus, a similar effect is obtained. For example, the ID of the power transmitting apparatus may be used. The power receiving apparatus stores the ID of the power transmitting apparatus received via the first communication unit 804 as additional information of the ADV_IND. It is sufficient that the power transmitting apparatus transmits a CONNECT to the ADV_IND where the ID of a power transmitting apparatus stored as additional information matches the ID of the power transmitting apparatus. Also, a similar effect can be obtained by not transmitting a CONNECT to an ADV_IND where the stored ID of a power transmitting apparatus does not match the ID of the power transmitting apparatus.

Also, the identification information additionally stored in the ADV_IND may be an ID of the power receiving apparatus of the transmission source of the ADV_IND. It is sufficient that the power transmitting apparatus transmits a CONNECT to the ADV_IND where the ID of a power receiving apparatus stored as additional information matches the ID of the power receiving apparatus received via the first communication unit 704. Also, a similar effect can be obtained by not transmitting a CONNECT to an ADV_IND where the stored ID of a power receiving apparatus does not match the ID of the power receiving apparatus received via the first communication unit 704.

In this manner, according to the present embodiment, the power transmitting apparatus and the power receiving apparatus can detect and resolve cross connection. Note that the foreign object detection processing described in the first embodiment may be executed by applying the first embodiment to the power transmitting apparatus and the power receiving apparatus of the present embodiment.

Other Embodiments

A configuration in which the first power transmitting apparatus 900 detects BD_ADDR overlap before the first power receiving apparatus 901 and the second power receiving apparatus 902 connect (receive a CONNECT) using BLE to the first power transmitting apparatus 900 has been described using FIG. 10B. However, another configuration may be used in which, when the first power receiving apparatus 901 receives a CONNECT from the first power transmitting apparatus 900 and control communication using BLE is being performed, the second power receiving apparatus 902 transmits the same BD_ADDR as that of the first power receiving apparatus 901 to the first power transmitting apparatus 900 and the first power transmitting apparatus 900 detects the overlap.

Also, as described above, a General Request packet is used as the packet that is transmitted when the first power receiving apparatus 901 sends a BD_ADDR transmission request to the first power transmitting apparatus 900. However, a Specific Request packet specified in the WPC standard may be used as the packet that is transmitted when the same request is sent.

Also, in the configuration of FIG. 10C, after the second power receiving apparatus 902 transmits a cross connection notification, the second power receiving apparatus 902 transmits a TERMINATE to the first power transmitting apparatus 900. However, another configuration may be used in which the first power transmitting apparatus 900 transmits a TERMINATE to the second power receiving apparatus 902 after receiving a cross connection notification.

Also, the first power transmitting apparatus 900 having received a cross connection notification from the second power receiving apparatus 902 may transmit a TERMINATE to the first power receiving apparatus 901 in response to the transmission of a cross connection notification and a BD_ADDR notification request to the first power receiving apparatus 901. Also, the first power receiving apparatus 901 may transmit a generated BD_ADDR to the first power transmitting apparatus 900 after reception of the TERMINATE.

Also, in the configuration described above, the Random Address is generated when the power transmitting and receiving apparatuses transmit a BD_ADDR via inbound communication. However, the Random Address may be periodically generated and changed when BLE connection processing ends and control communication of power transmission and reception is being performed.

Also, the power transmitting apparatus is configured to transmit a NAK for the BD_ADDR using inbound communication and the power receiving apparatus is configured to receive this using inbound communication. However, outbound communication using BLE may be used.

Also, by the power transmitting apparatus transmitting a NAK to the BD_ADDR notified by the power receiving apparatus, the power receiving apparatus is notified of Random Address overlap. However, as long as the data indicates overlapped Random Addresses, different Random Addresses being generated, and transmitting the Random Addresses, other data may be used. For example, a configuration may be used in which a BD_ADDR overlap notification, a BD_ADDR regeneration request, or a re-transmission request is transmitted or a combination of these is transmitted. Also, the power receiving apparatus having received such a notification may regenerate a different Random Address and transmit this to the power transmitting apparatus.

Also, the power receiving apparatus is configured to transmit a NAK for the BD_ADDR using inbound communication and the power transmitting apparatus is configured to receive this using inbound communication. However, outbound communication using BLE may be used.

Also, by the power receiving apparatus transmitting a NAK to the BD_ADDR notified by the power transmitting apparatus, the power transmitting apparatus is notified of Random Address overlap. However, as long as the data indicates overlapped Random Addresses, different Random Addresses being generated, and transmitting the Random Addresses, other data may be used. For example, a configuration may be used in which a BD_ADDR overlap notification, a BD_ADDR regeneration request, or a re-transmission request is transmitted or a combination of these is transmitted. Also, the power transmitting apparatus having received such a notification may regenerate a different Random Address and transmit this to the power receiving apparatus.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

The invention claimed is:

1. A power transmitting apparatus comprising:
  a first power transmitting unit configured to wirelessly transmit power to a first power receiving apparatus;
  a second power transmitting unit configured to wirelessly transmit power to a second power receiving apparatus;
  a first obtaining unit configured to obtain first data indicating a relationship between transmission power of the first power transmitting unit and reception power of the first power receiving apparatus when power is transmitted to the first power receiving apparatus using the first power transmitting unit;
  a second obtaining unit configured to obtain second data indicating a relationship between transmission power of the second power transmitting unit and reception power of the second power receiving apparatus when power is transmitted to the second power receiving apparatus using the second power transmitting unit;
  a third obtaining unit configured to obtain third data indicating a relationship between transmission power of the first power transmitting unit and the second power transmitting unit and reception power of the first power receiving apparatus and the second power receiving apparatus when power is transmitted to the first power receiving apparatus and the second power receiving apparatus simultaneously using the first power transmitting unit and the second power transmitting unit; and
  a detecting unit configured to detect an object that is not the first power receiving apparatus or the second power receiving apparatus using the first data, the second data, and the third data.

2. The power transmitting apparatus according to claim 1, further comprising:
  a generating unit configured to, to detect the object in the first power transmitting unit, generate information for detecting the object using transmission power of the second power transmitting unit when detecting for the object and the first data and the third data, wherein
  the detecting unit detects the object using the information.

3. The power transmitting apparatus according to claim 2, wherein
  the generating unit generates fourth data using a transmission power value of the second power transmitting unit from the first data and the third data, and
  the detecting unit detects the object using the fourth data.

4. The power transmitting apparatus according to claim 1, further comprising:
  a generating unit configured to, to detect the object in the second power transmitting unit, generate information for detecting the object using transmission power of the first power transmitting unit when detecting for the object and the second data and the third data, wherein
  the detecting unit detects the object using the information.

5. The power transmitting apparatus according to claim 4, wherein
  the generating unit generates fourth data using a transmission power value of the first power transmitting unit from the second data and the third data, and
  the detecting unit detects the object using the fourth data.

6. A power transmitting apparatus provided with a plurality of power transmitting unit and capable of wirelessly transmitting power to a plurality of power receiving apparatuses using the plurality of power transmitting unit, the apparatus comprising:
  a first obtaining unit configured to obtain first data indicating a relationship between transmission power of each one of the plurality of power transmitting unit and reception power of the power receiving apparatuses that are power transmission targets when power is transmitted, using the plurality of power transmitting unit, to any one of the plurality of power receiving apparatuses which are the power transmission targets of the plurality of power transmitting unit;
  a second obtaining unit configured to obtain second data indicating a relationship between transmission power of each one of the plurality of power transmitting unit and reception power of each one of the plurality of power receiving apparatuses when power is transmitted to the plurality of power receiving apparatuses simultaneously using the plurality of power transmitting unit; and
  a detecting unit configured to detect an object that is not any one of the plurality of power receiving apparatuses using the first data and the second data.

7. The power transmitting apparatus according to claim 1, wherein

The detecting unit detects an object on a basis of a power loss method specified in a WPC (Wireless Power Consortium) standard.

8. A power transmitting apparatus comprising:

a communicating unit configured to perform communication compatible with BLE (Bluetooth Low Energy);

a power transmitting unit configured to wirelessly transmit power to a power receiving apparatus; and a determining unit configured to determine whether or not first identification information, which is identification information for BLE of a first power receiving apparatus received by the communicating unit and generated by the first power receiving apparatus, and second identification information, which is identification information for BLE of a second power receiving apparatus received after reception of the first identification information and generated by the second power receiving apparatus, are the same, wherein when the first identification information and the second identification information are the same, the communicating unit transmits, to the second power receiving apparatus, a signal indicating that the first identification information and the second identification information are the same, a signal indicating a request to regenerate the second identification information, or a signal indicating a request to notify the power transmitting apparatus of the regenerated second identification information, and when the first identification information and the second identification information are different from each other, the power transmitting unit wirelessly transmits power to the first power receiving apparatus and the second power receiving apparatus via the power transmitting unit.

9. A power transmitting apparatus comprising:

a communicating unit configured to perform communication compatible with BLE (Bluetooth Low Energy); and a power transmitting unit configured to wirelessly transmit power to a power receiving apparatus, wherein the communicating unit receives first identification information, which is identification information for BLE of a first power receiving apparatus generated by the first power receiving apparatus which is a power transmission target for the power transmitting unit, and when a cross connection notification is received from a second power receiving apparatus with an established BLE communication connection after reception of the first identification information, the communicating unit transmits, to the first power receiving apparatus, a signal indicating a request to regenerate the first identification information or a signal indicating a request to notify the power transmitting apparatus of the regenerated first identification information.

10. A control method for a power transmitting apparatus provided with first power transmitting unit and second power transmitting unit and capable of transmitting power to a first power receiving apparatus and a second power receiving apparatus using the first power transmitting unit and the second power transmitting unit, the method comprising:

obtaining first data indicating a relationship between transmission power of the first power transmitting unit and reception power of the first power receiving apparatus when power is transmitted to the first power receiving apparatus using the first power transmitting unit;

obtaining second data indicating a relationship between transmission power of the second power transmitting unit and reception power of the second power receiving apparatus when power is transmitted to the second power receiving apparatus using the second power transmitting unit;

obtaining third data indicating a relationship between transmission power of the first power transmitting unit and the second power transmitting unit and reception power of the first power receiving apparatus and the second power receiving apparatus when power is transmitted to the first power receiving apparatus and the second power receiving apparatus simultaneously using the first power transmitting unit and the second power transmitting unit; and detecting an object that is not the first power receiving apparatus or the second power receiving apparatus using the first data, the second data, and the third data.

11. A control method for a power transmitting apparatus provided with a plurality of power transmitting unit and capable of transmitting power to a plurality of power receiving apparatuses using the plurality of power transmitting unit, the method comprising:

obtaining first data indicating a relationship between transmission power of each one of the plurality of power transmitting unit and reception power of the power receiving apparatuses that are power transmission targets when power is transmitted, using the plurality of power transmitting unit, to any one of the plurality of power receiving apparatuses which are the power transmission targets of the plurality of power transmitting unit;

obtaining second data indicating a relationship between transmission power of each one of the plurality of power transmitting unit and reception power of each one of the plurality of power receiving apparatus when power is transmitted to the plurality of power receiving apparatuses simultaneously using the plurality of power transmitting unit; and detecting an object that is not any one of the plurality of power receiving apparatuses using the first data and the second data.

12. A control method for a power transmitting apparatus provided with communicating unit configured to perform communication compatible with BLE (Bluetooth Low Energy) and power transmitting unit configured to transmit power to a power receiving apparatus comprising:

determining whether or not first identification information, which is identification information for BLE of a first power receiving apparatus received by the communicating unit and generated by the first power receiving apparatus, and second identification information, which is identification information for BLE of a second power receiving apparatus received after reception of the first identification information and generated by the second power receiving apparatus, are the same;

transmitting via the communicating unit, when the first identification information and the second identification information are the same, to the second power receiving apparatus, a signal indicating that the first identification information and the second identification information are the same, a signal indicating a request to regenerate the second identification information, or a signal indicating a request to notify the power transmitting apparatus of the regenerated second identification information; and transmitting power to the first power receiving apparatus and the second power receiving apparatus via the power transmitting unit when the first identification information and the second identification information are different from each other.

13. A control method for a power transmitting apparatus provided with communicating unit configured to perform communication compatible with BLE (Bluetooth Low Energy) and power transmitting unit configured to transmit power to a power receiving apparatus comprising:

receiving, via the communicating unit, first identification information, which is identification information for BLE of a first power receiving apparatus generated by the first power receiving apparatus which is a power transmission target for the power transmitting unit; and transmitting, to the first power receiving apparatus via the communicating unit, a signal indicating a request to regenerate the first identification information or a signal indicating a request to notify the power transmitting apparatus of the regenerated first identification information when a cross connection notification is received from a second power receiving apparatus with an established BLE communication connection after reception of the first identification information.

14. A non-transitory computer-readable storage medium storing a program for causing a computer to execute a control method for a power transmitting apparatus provided with first power transmitting unit and second power transmitting unit and capable of transmitting power to a first power receiving apparatus and a second power receiving apparatus using the first power transmitting unit and the second power transmitting unit, the method comprising:

obtaining first data indicating a relationship between transmission power of the first power transmitting unit and reception power of the first power receiving apparatus when power is transmitted to the first power receiving apparatus using the first power transmitting unit;

obtaining second data indicating a relationship between transmission power of the second power transmitting unit and reception power of the second power receiving apparatus when power is transmitted to the second power receiving apparatus using the second power transmitting unit;

obtaining third data indicating a relationship between transmission power of the first power transmitting unit and the second power transmitting unit and reception power of the first power receiving apparatus and the second power receiving apparatus when power is transmitted to the first power receiving apparatus and the second power receiving apparatus simultaneously using the first power transmitting unit and the second power transmitting unit; and detecting an object that is not the first power receiving apparatus or the second power receiving apparatus using the first data, the second data, and the third data.

15. A non-transitory computer-readable storage medium storing a program for causing a computer to execute a control method for a power transmitting apparatus provided with a plurality of power transmitting unit and capable of transmitting power to a plurality of power receiving apparatuses using the plurality of power transmitting unit, the method comprising:

obtaining first data indicating a relationship between transmission power of each one of the plurality of power transmitting unit and reception power of the power receiving apparatuses that are power transmission targets when power is transmitted, using the plurality of power transmitting unit, to any one of the plurality of power receiving apparatuses which are the power transmission targets of the plurality of power transmitting unit;

obtaining second data indicating a relationship between transmission power of each one of the plurality of power transmitting unit and reception power of each one of the plurality of power receiving apparatus when power is transmitted to the plurality of power receiving apparatuses simultaneously using the plurality of power transmitting unit; and detecting an object that is not any one of the plurality of power receiving apparatuses using the first data and the second data.

16. A non-transitory computer-readable storage medium storing a program for causing a computer to execute a control method for a power transmitting apparatus provided with communicating unit configured to perform communication compatible with BLE (Bluetooth Low Energy) and power transmitting unit configured to transmit power to a power receiving apparatus comprising:

determining whether or not first identification information, which is identification information for BLE of a first power receiving apparatus received by the communicating unit and generated by the first power receiving apparatus, and second identification information, which is identification information for BLE of a second power receiving apparatus received after reception of the first identification information and generated by the second power receiving apparatus, are the same;

transmitting via the communicating unit, when the first identification information and the second identification information are the same, to the second power receiving apparatus, a signal indicating that the first identification information and the second identification information are the same, a signal indicating a request to regenerate the second identification information, or a signal indicating a request to notify the power transmitting apparatus of the regenerated second identification information; and transmitting power to the first power receiving apparatus and the second power receiving apparatus via the power transmitting unit when the first identification information and the second identification information are different from each other.

17. A non-transitory computer-readable storage medium storing a program for causing a computer to execute a control method for a power transmitting apparatus provided with communicating unit configured to perform communication compatible with BLE (Bluetooth Low Energy) and power transmitting unit configured to transmit power to a power receiving apparatus comprising:

receiving, via the communicating unit, first identification information, which is identification information for BLE of a first power receiving apparatus generated by the first power receiving apparatus which is a power transmission target for the power transmitting unit; and transmitting, to the first power receiving apparatus via the communicating unit, a signal indicating a request to regenerate the first identification information or a signal indicating a request to notify the power transmitting apparatus of the regenerated first identification information when a cross connection notification is received from a second power receiving apparatus with an established BLE communication connection after reception of the first identification information.

* * * * *